United States Patent
Shimizu et al.

(10) Patent No.: US 9,242,599 B2
(45) Date of Patent: Jan. 26, 2016

(54) VEHICLE APPROACH ALERT DEVICE FOR SADDLE-RIDDEN ELECTRIC VEHICLE

(75) Inventors: Satoru Shimizu, Wako (JP); Masahiro Akiba, Wako (JP); Ryuji Akiba, Wako (JP); Kazuhiko Tanaka, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 338 days.

(21) Appl. No.: 14/001,635

(22) PCT Filed: Feb. 3, 2012

(86) PCT No.: PCT/JP2012/052524
§ 371 (c)(1),
(2), (4) Date: Aug. 26, 2013

(87) PCT Pub. No.: WO2012/117807
PCT Pub. Date: Sep. 7, 2012

(65) Prior Publication Data
US 2014/0015656 A1   Jan. 16, 2014

(30) Foreign Application Priority Data

| Feb. 28, 2011 | (JP) | 2011-043322 |
| Feb. 28, 2011 | (JP) | 2011-043323 |
| Feb. 28, 2011 | (JP) | 2011-043324 |
| Feb. 28, 2011 | (JP) | 2011-043325 |

(51) Int. Cl.
*B60Q 1/00* (2006.01)
*B60Q 5/00* (2006.01)
(Continued)

(52) U.S. Cl.
CPC .......... *B60Q 5/008* (2013.01); *B60Q 1/0017* (2013.01); *B62J 3/00* (2013.01); *G10K 9/22* (2013.01); *G10K 11/004* (2013.01); *B62K 2202/00* (2013.01); *B62K 2204/00* (2013.01)

(58) Field of Classification Search
CPC ......... B60Q 1/0017; B60Q 5/008; B62J 3/00; G10K 11/004; G10K 9/22; B62K 2202/00; B62K 2204/00
See application file for complete search history.

(56) References Cited

U.S. PATENT DOCUMENTS

| 4,403,208 A | * | 9/1983 | Hodgson | G08G 1/161 340/902 |
| 4,701,750 A | * | 10/1987 | Wilkinson | G08B 3/10 340/384.3 |

(Continued)

FOREIGN PATENT DOCUMENTS

| EP | 2008-143442 A1 | 1/2013 |
| JP | 2-249777 A | 10/1990 |

(Continued)

OTHER PUBLICATIONS

Notice of Allowance issued in corresponding Japanese Patent Application No. 2011-043322 on Jun. 30, 2015 (with English translation).

(Continued)

*Primary Examiner* — Quang D Pham
(74) *Attorney, Agent, or Firm* — Birch, Stewart, Kolasch & Birch, LLP

(57) ABSTRACT

A vehicle approach alert device for a saddle-ridden electric vehicle is a vehicle approach alert device for a saddle-ridden electric vehicle that is provided with a sound emitter that is attached on the vehicle body of a saddle-ridden electric vehicle having an electric motor in a power engine, and that emits an alert sound to a surrounding area for notifying the surrounding area of approach of the saddle-ridden electric vehicle, such that sound emission of the sound emitter is controlled, and the sound emitter is arranged so that the direction of sound emission is oriented diagonally downward and forward of the saddle-ridden electric vehicle.

20 Claims, 14 Drawing Sheets

(51) Int. Cl.
  *B62J 3/00* (2006.01)
  *G10K 9/22* (2006.01)
  *G10K 11/00* (2006.01)

(56) References Cited

U.S. PATENT DOCUMENTS

| | | | | |
|---|---|---|---|---|
| 5,635,903 | A * | 6/1997 | Koike | A63H 17/34 340/384.1 |
| 6,859,539 | B1 * | 2/2005 | Maeda | H04R 5/04 381/163 |
| 7,203,321 | B1 * | 4/2007 | Freymann | B60Q 5/00 381/61 |
| 8,018,328 | B2 * | 9/2011 | Goldstein | B60Q 5/00 340/384.1 |
| 8,031,085 | B1 * | 10/2011 | Anderson | B60Q 5/008 340/425.5 |
| 8,730,020 | B2 * | 5/2014 | Konet | B60Q 5/008 340/384.1 |
| 8,860,585 | B2 * | 10/2014 | Tsuzuki | G08G 1/166 340/425.5 |
| 8,892,333 | B2 * | 11/2014 | Fujii | B60L 11/12 701/102 |
| 8,978,797 | B2 * | 3/2015 | Takewaka | B60Q 5/008 180/65.1 |
| 2004/0151328 | A1 * | 8/2004 | Hasegawa | H03G 5/22 381/86 |
| 2005/0113168 | A1 * | 5/2005 | Maeda | G10K 15/02 463/35 |
| 2008/0094254 | A1 * | 4/2008 | Hill | B60Q 5/00 340/944 |
| 2008/0128190 | A1 | 6/2008 | Tsutsumi et al. | |
| 2009/0178870 | A1 * | 7/2009 | Takahashi | B62J 17/02 180/229 |
| 2011/0026729 | A1 * | 2/2011 | Nakayama | B60Q 5/008 381/86 |
| 2011/0054318 | A1 * | 3/2011 | Shin | A61B 5/489 600/443 |
| 2011/0181442 | A1 * | 7/2011 | Nakayama | B60Q 5/008 340/933 |
| 2011/0199199 | A1 * | 8/2011 | Perkins | B60Q 1/506 340/435 |
| 2012/0050020 | A1 * | 3/2012 | Konet | B60Q 5/008 340/384.1 |
| 2012/0062391 | A1 * | 3/2012 | Pan | H03G 3/32 340/901 |
| 2012/0068836 | A1 * | 3/2012 | Konet | G10K 15/02 340/425.5 |
| 2012/0130580 | A1 * | 5/2012 | Omote | G10K 15/02 701/22 |
| 2012/0182136 | A1 * | 7/2012 | Nakayama | B60Q 5/008 340/425.5 |
| 2012/0299717 | A1 * | 11/2012 | Yoshino | B60Q 9/00 340/466 |
| 2012/0312609 | A1 * | 12/2012 | Takewaka | B60Q 5/008 180/65.1 |

FOREIGN PATENT DOCUMENTS

| | | |
|---|---|---|
| JP | 5-213112 A | 8/1993 |
| JP | 8-310465 A | 11/1996 |
| JP | 11-245722 A | 9/1999 |
| JP | 2002-254934 A | 9/2002 |
| JP | 2004-161180 A | 6/2004 |
| JP | 2005-145203 A | 6/2005 |
| JP | 2005-297640 A | 10/2005 |
| JP | 2008-132910 A | 6/2008 |
| JP | 2008-143442 A | 6/2008 |
| JP | 2008-195137 A | 8/2008 |
| JP | 2008-308113 A | 12/2008 |
| JP | 2009-063968 A | 3/2009 |
| JP | 2009-173262 A | 8/2009 |
| JP | 2009-202787 A | 9/2009 |
| JP | 2010-58769 A | 3/2010 |
| JP | 2010-100195 A | 5/2010 |
| JP | 2010-120597 A | 6/2010 |
| JP | 2010-198100 A | 9/2010 |
| JP | 2010-215215 A | 9/2010 |
| JP | 2010-228628 A | 10/2010 |
| JP | 2010-247811 A | 11/2010 |
| JP | 2011-031865 A | 2/2011 |
| TW | 316835 U | 8/2007 |
| TW | 391493 U1 | 11/2010 |

OTHER PUBLICATIONS

Notice of Allowance issued in corresponding Japanese Patent Application No. 2011-043323 on Jun. 30, 2015 (with English translation).

* cited by examiner

VEHICLE APPROACH ALERT DEVICE FOR SADDLE-RIDDEN ELECTRIC VEHICLE

TECHNICAL FIELD

The present invention relates to a vehicle approach alert device for a saddle-ridden electric vehicle that outputs an alert sound for notifying of approach of a vehicle.

Priority is claimed on Japanese Patent Application No. 2011-043322, filed Feb. 28, 2011, Japanese Patent Application No. 2011-043323, filed Feb. 28, 2011, Japanese Patent Application No. 2011-043324, filed Feb. 28, 2011, and Japanese Patent Application No. 2011-043325, filed Feb. 28, 2011, the contents of which are incorporated herein by reference.

BACKGROUND ART

In motor vehicles such as electric vehicles and hybrid vehicles, which are being developed in recent years, there is a problem in that it is difficult for pedestrians or other road users to recognize approach of an electric motor powered vehicle due to traveling noise thereof being smaller when it is traveling with an electric motor, compared to traveling noise of an engine powered vehicle, and there is a demand for an appropriate measure to address this problem.

For example, Patent Document 1 below discloses a vehicle approach alert device such that in a hybrid four wheeled vehicle that travels with driving force of an electric motor primarily at low speeds, when the vehicle speed is lower than or equal to a predetermined value and also the brake is detected as being operated, a speaker arranged on the inner side of the bumper at the vehicle body front part outputs an alert sound to thereby notify pedestrians and other road users of approach of this vehicle.

PRIOR ART DOCUMENT

Patent Document

[Patent Document 1] Japanese Unexamined Patent Application, First Publication No. 2008-195137

SUMMARY OF INVENTION

Problems to be Solved by the Invention

However, an application of an excessively large speaker is not possible when attaching a speaker (sound emitter) to a saddle-ridden vehicle such as two wheeled vehicle, which has less surplus space compared to a four wheeled vehicle. Therefore, there is a demand for an arrangement in which a high level of alerting effect can be obtained even when a comparatively small sized speaker is used.

Moreover, in those cases of a comparatively small saddle-ridden vehicle, there is also a problem in that there is a limitation in separating the speaker from the driver, and it is difficult to balance reduction in the magnitude of alert sound to be heard by the driver, and the volume of an alert sound to be delivered to the surrounding area, which is the intended purpose.

In an aspect of the present invention, it is an object to provide a vehicle approach alert device for a saddle-ridden electric vehicle that optimizes the arrangement of a sound emitter that outputs an alert sound for notifying the surrounding area of approach of a vehicle.

Means for Solving the Problem

The aspect of the present invention employs the following aspects in order to solve the above problem and achieve the object. That is to say:

(1) An aspect of the present invention is a vehicle approach alert device for a saddle-ridden electric vehicle that is attached to a vehicle body of a saddle-ridden electric vehicle having an electric motor included in a power engine, and that is provided with a sound emitter that emits an alert sound to a surrounding area for notifying the surrounding area of approach of the saddle-ridden electric vehicle, wherein sound emission of the sound emitter is controlled according to a traveling status of the vehicle, and the sound emitter is arranged so that a direction of the sound emission is oriented diagonally downward and forward of the saddle-ridden electric vehicle.

(2) In the aspect of (1) above, the saddle-ridden electric vehicle may be provided with a front cover that covers the periphery of a head pipe of a vehicle body frame, and the sound emitter may be arranged on an inner side of the front cover.

The saddle-ridden electric vehicle includes electric vehicles in general, over the vehicle body of which a driver straddles to ride on the vehicle, and it includes not only two wheeled vehicles (including scooter type vehicles) but also three wheeled vehicles (including front two wheeled and rear one wheeled vehicles, in addition to front one wheeled and rear two wheeled vehicles) and four wheeled vehicles.

(3) In the aspect of (2) above, the saddle-ridden electric vehicle may be further provided with a sound emission duct that extends diagonally downward and forward from the sound emitter along the sound emission direction, and the sound emitter may be attached to the vehicle body frame, on the inner side of the front cover, and may emit a sound to an outer side of the front cover through the sound emission duct.

(4) In the aspect of either one of (2) and (3) above, the sound emitter may be arranged on the lower side of the head pipe.

(5) In the aspect of (4) above, the sound emitter may be arranged on an outer side of a front fender of the saddle-ridden electric vehicle.

(6) In the aspect of any one of (2) through (5), the saddle-ridden electric vehicle may be further provided with a vehicle body frame member that extends diagonally backward and downward of this saddle-ridden electric vehicle, from the head pipe; on the head pipe there may be steerably supported a front fork that extends diagonally forward and downward and that suspends a front wheel; and the sound emitter may be arranged in front of the vehicle body frame member and at the rear of the front fork when this saddle-ridden electric vehicle is seen from a side.

(7) In the aspect of any one of (2) through (5) above, on the head pipe, there may be steerably supported a front fork that extends diagonally forward and downward and that suspends a front wheel, and the sound emitter may be arranged in front of the front fork when this saddle-ridden electric vehicle is seen from a side.

(8) In the aspect of (1) above, the saddle-ridden electric vehicle may be further provided with a driving unit that supports the electric motor and a driving wheel, and that is connected to the vehicle body frame so as to be able to swing vertically with respect to the vehicle body frame, and the sound emitter may be provided on the driving unit and also at a position below a driver's seat part.

The saddle-ridden electric vehicle includes electric vehicles in general, over the vehicle body of which a driver straddles to ride on the vehicle, and it includes not only two wheeled vehicles (including scooter type vehicles) but also three wheeled vehicles (including front two wheeled and rear one wheeled vehicles, in addition to front one wheeled and rear two wheeled vehicles) and four wheeled vehicles.

(9) In the aspect of (8) above, the saddle-ridden electric vehicle may be further provided with a unit cover that covers the driving unit, and within the unit cover, there may be arranged the sound emitter.

(10) In the aspect of either one of (8) and (9) above, the saddle-ridden electric vehicle may be a swing type vehicle such that the vehicle body frame swings left and right with respect to the driving unit having a pair of the driving wheels, and the sound emitter may be arranged above a swing mechanism that connects the driving unit and the vehicle body frame.

(11) In the aspect of any one of (8) through (10) above, the saddle-ridden electric vehicle may be further provided with a battery between the pair of driving wheels, and the sound emitter may be arranged in front of the battery.

(12) In the aspect of (1) above, the sound emitter may be arranged on an inner side of an electrical component that is exposed to an outside of the saddle-ridden electric vehicle.

The saddle-ridden electric vehicle includes electric vehicles in general, over the vehicle body of which a driver straddles to ride on the vehicle, and it includes not only two wheeled vehicles (including scooter type vehicles) but also three wheeled vehicles (including front two wheeled and rear one wheeled vehicles, in addition to front one wheeled and rear two wheeled vehicles) and four wheeled vehicles.

(13) In the aspect of (12) above, the electrical component may be arranged in front of a head pipe of the vehicle body frame.

(14) In the aspect of either one of (12) and (13) above, the electrical component may be a head lamp arranged at a front end of the vehicle body.

(15) In the aspect of either one of (12) and (13) above, the electrical component may be a meter unit arranged at a front end of the vehicle body.

(16) In the aspect of (1) above, the saddle-ridden electric vehicle may be further provided, at the rear of a head pipe of a vehicle body frame, with an exterior member having a knee grip part that is to be sandwiched between both knees of the driver, and the sound emitter may be arranged on an inner side of the exterior member.

The saddle-ridden electric vehicle includes electric vehicles in general, over the vehicle body of which a driver straddles to ride on the vehicle, and it includes not only two wheeled vehicles (including scooter type vehicles) but also three wheeled vehicles (including front two wheeled and rear one wheeled vehicles, in addition to front one wheeled and rear two wheeled vehicles) and four wheeled vehicles.

(17) In the aspect of (16) above, the exterior member may have an opening part that opens toward the direction of the sound emission.

(18) In the aspect of either one of (16) and (17) above, the sound emitter may be arranged within a front end part of the exterior member.

(19) In the aspect of any one of (16) through (18) above, a driving control device for the power engine and an output control device for the sound emitter may be arranged within the exterior member.

(20) In the aspect of any one of (16) through (19) above, a battery that serves as a power supply for the sound emitter may be arranged within the exterior member.

(21) In the aspect of any one of (1) through (20) above, the sound emitter may raise a frequency of the alert sound [in proportion to] with an increase in a rotation speed of the electric motor, and an increase rate of this alert sound frequency may be set so as to be lower than an increase rate of the rotation speed of the electric motor.

(22) In the aspect of any one of (1) through (20) above, a sound emission frequency of the sound emitter may be between 100 HZ and 800 HZ.

(23) In the aspect of (21) above, a sound emission frequency of the sound emitter may be between 100 HZ and 800HZ.

Effect of the Invention

According to the aspect of (1) above, by controlling sound emission of the sound emitter according to the traveling status, and orienting the sound emission direction of the sound emitter to the diagonally downward and forward direction, it is possible to efficiently transmit an alert sound to the surrounding area while appropriately utilizing ground sound reflection according to the traveling status.

Moreover, by orienting the sound emission direction to the direction opposite to the driver, it is possible to reduce the magnitude of the alert sound to be heard by the driver.

According to the aspect of (2) above, by orienting the sound emission direction of the sound emitter to the diagonally downward and forward direction, it is possible to efficiently transmit an alert sound to the surrounding area while utilizing ground sound reflection.

Moreover, it becomes possible to arrange the sound emitter within the front cover of the saddle-ridden electric vehicle, the lengthwise space of which is comparatively small while taking ground reflection of an alert sound into consideration, and it becomes possible even with a small sound emitter to obtain a high level of alerting effect.

Furthermore, by arranging the sound emitter distanced from the driver and orienting the sound emission direction thereof to the direction opposite to the driver, it is possible to reduce the magnitude of the alert sound to be heard by the driver.

According to the aspect of (3) above, while arranging the sound emitter inside the front cover, an alert sound can be emitted with a directionality efficiently through the sound emission duct to the outside of the front cover, and it is possible to increase the level of the alerting effect and further reduce the magnitude of the alert sound to be heard by the driver.

According to the aspect of (4) above, the sound emitter can be arranged distanced from the driver and in close proximity to the ground, using the space below the head pipe, which has a comparatively small number of components, and it is possible to reduce the magnitude of an alert sound to be heard by the driver and transmit the alert sound to the surrounding area efficiently, also utilizing ground sound reflection.

According to the aspect of (5) above, it is possible to arrange the sound emitter distanced from the driver, and by arranging the sound emitter at a position that receives a comparatively small amount of mud splash caused by the front wheel, it is also possible to make an advantageous arrangement for waterproofing the sound emitter.

According to the aspect of (6) above, by arranging the sound emitter within the space having a triangular shape in side view, formed below the head pipe by the vehicle body frame member and the front fork, it is possible to efficiently arrange the sound emitter below the head pipe and protect the sound emitter easily.

According to the aspect of (7) above, by arranging the sound emitter below the head pipe and in front of the front fork, it is possible to arrange the sound emitter distanced from the driver and further reduce the magnitude of an alert sound to be heard by the driver.

According to the aspect of (8) above, by arranging the sound emitter below the driver's seat part and on the driving unit, which is comparatively close to the ground, it is possible to reduce the magnitude of an alert sound to be heard by the driver due to the sound emitter being distanced therefrom, and transmit the alert sound efficiently to the surrounding area using ground sound reflection also.

According to the aspect of (9) above, sound emission of the sound emitter can be diffused within the unit cover to efficiently transmit this sound to the surrounding area, and the sound emitter can be protected easily. Moreover, it is also possible to further reduce the magnitude of an alert sound to be heard by the driver.

According to the aspect of (10) above, it is possible, with a comparatively strong swing mechanism, to suppress mud splash made to the sound emitter from the road surface.

According to the aspect of (11) above, the mass of the driving unit can be concentrated, and the wiring arrangement can be established easily when connecting a battery to the electric motor. Moreover, by arranging the sound emitter in front of the battery, the sound reflection effect of a battery with mass can give an alert sound a forward directionality, while efficiently diffusing the alert sound within the driving unit.

According to the aspect of (12) above, by installing the sound emitter within an electrical component that is exposed to the exterior of the vehicle, it is possible to efficiently transmit an alert sound to the surrounding area and protect the sound emitter easily. Moreover, with the sound emission direction of the sound emitter being oriented downward, an alert sound can be efficiently transmitted to the surrounding area using ground sound reflection, and it is possible to further reduce the magnitude of the alert sound to be heard by the driver.

According to the aspect of (13) above, it is possible to efficiently transmit an alert sound to the area in front of the vehicle, and reduce the magnitude of the alert sound to be heard by the driver.

According to the aspect of either one of (14) and (15) above, sound can be transmitted to the area in front of the vehicle, and the magnitude of sound to be heard by the driver can be reduced. Moreover, it is possible to simplify the structure of the sound emitter by using a waterproof structure for an electrical component.

According to the aspect of (16) above, with the sound emitter being arranged within the exterior member, which is comparatively large, it is possible to make use of the hollow within the exterior member to thereby achieve superior sound transmission, and suppress sound transmission to the upper side (driver side) of the exterior member to thereby reduce the magnitude of sound to be heard by the driver. Moreover, with the sound emitter emitting a sound diagonally downward and forward, it is possible to transmit sound efficiently to the surrounding area, using ground sound reflection. Furthermore, it is possible, with the exterior member, to protect the sound emitter easily.

According to the aspect of (17) above, sound of the sound emitter can be easily emitted to the outside of the cover (diagonally downward and forward), and sound can be transmitted efficiently to the surrounding area using ground sound reflection, while reducing the magnitude of an alert sound to be heard by the driver.

According to the aspect of (18) above, the sound emitter can be placed distanced from the driver, and it is possible to further reduce the magnitude of an alert sound to be heard by the driver.

According to the aspect of (19) above, the sound emitter, the output control device, and the driving control device are arranged in close proximity to each other, and as a result, wiring between these devices can be established easily, and protection of the respective devices can be achieved easily.

According to the aspect of (20) above, the sound emitter and the battery, which serves as a power supply thereof, are arranged in close proximity to each other, and as a result, wiring between them can be established easily.

According to the aspect of (21) above, by raising the sound emission frequency of the sound emitter [in proportion to] with the increase in the rotation speed of the electric motor, the state of acceleration and/or deceleration of the vehicle can be comprehended by pedestrians and other road users, and it is possible, in combination with the arrangement of the sound emitter, to obtain a high level of alerting effect even with a small sound emitter.

Moreover, by making the increase rate of the alert sound frequency lower than the increase rate of the electric motor rotation speed, it is possible to make the surroundings recognize acceleration of the vehicle while setting the alert sound at a favorable tone range that also has a high level of alerting effect.

According to the aspect of either one of (22) and (23) above, with the alert sound frequency being set within a range between 100 HZ and 800 HZ, it is possible, in combination with the arrangement of the sound emitter, to emit a sound that can be easily heard by and is favorable to people of any age group, using a small sound emitter.

BEST MODE FOR CARRYING OUT THE INVENTION

Hereunder, embodiments of the present inventions are described, with reference to the figures. The upward orientation and the forward orientation in each figure correspond to the orientation of the arrow illustrated in each figure. Moreover, the left-right direction and the front-rear direction refer to the direction viewed from the driver.

<First Embodiment>

Figure 1:
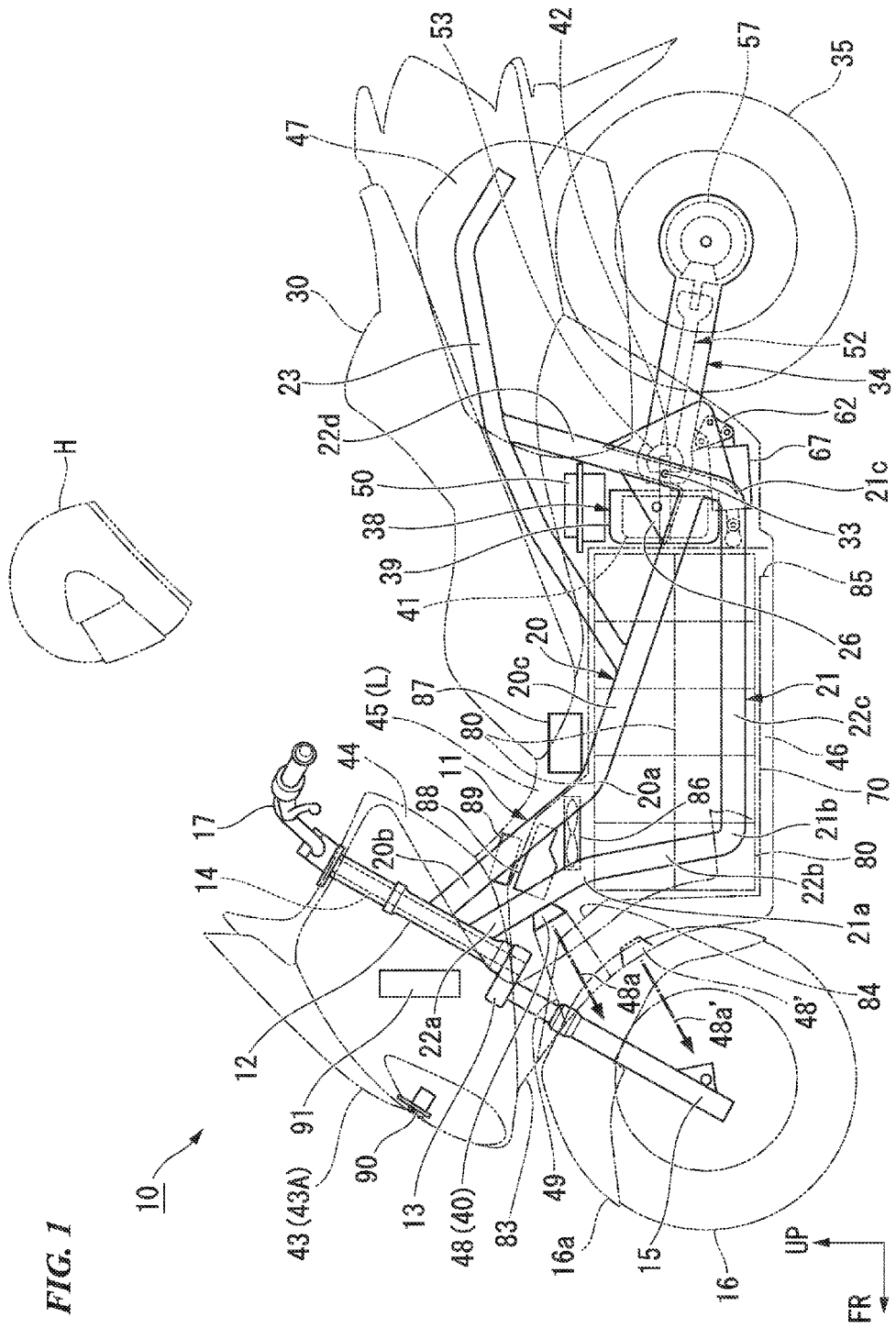
FIG. 1 is a left side view of a two wheeled vehicle to which a vehicle approach alert device for a saddle-ridden electric vehicle in a first embodiment of the present invention is applied.

First, a first embodiment of the present invention is described, with reference to FIG. 1.

A two wheeled vehicle 10 illustrated in FIG. 1 that serves as a saddle-ridden electric vehicle is a scooter type vehicle having a low floor part (straddling part) L at a lengthwise intermediate part of the vehicle body. The two wheeled vehicle 10 has a main battery 80 for traveling mounted on the inner side of the low floor part L, and a motor unit (electric motor, power engine) 38 for traveling mounted immediately rear of the main battery 80, and the motor unit 38 is driven with electric power supplied from the main battery 80, and the driving force is transmitted to a rear wheel 35 for the two wheeled vehicle 10 to travel. Arrow FR in the figure denotes the front side of the vehicle and the arrow UP denotes the upper side of the vehicle.

A vehicle body frame 11 of the two wheeled vehicle 10 has, at the front end part thereof, a head pipe 12 that is tilted backward with respect to the perpendicular direction. An upper part of a front fork 15 with a pair of left and right portions that axially supports a front wheel 16 on a lower end part, is steerably supported on the head pipe 12 via a steering stem 14 that is turnably inserted into this head pipe 12, and a bottom bridge 13 that is fixed at the lower end thereof. The upper part of the steering stem 14 projects to the upper side of the head pipe 12, and a handle bar 17 is attached on this projecting portion. At the lower part of the front fork 15 with left and right portions, there is attached a front fender 16a that suppresses mud and road debris from being splashed or thrown up by the front wheel 16.

On the lower side of the rear part of the vehicle body frame 11, there is swingably supported, via a pivot shaft 33 along the vehicle widthwise direction (left-right direction), the front end part of a swing arm 34 that is tilted backward and downward with respect to the horizontal direction, and a rear wheel 35 is axially supported on the rear end part of this swing arm 34. Immediately in front of the pivot shaft 33, there is arranged a motor unit 38 that has a driving shaft 42 along the vehicle lengthwise direction, and the rear end part of the driving shaft 42 of this motor unit 38 and the front end part of the drive shaft 52 that is inserted into the swing arm 34 are connected via a constant velocity joint 53. The rear end part of the drive shaft 52 is engaged with the rear wheel 35 via, for example, a bevel gear mechanism 57, so as to be able to transmit power the rear wheel 35.

The vehicle body frame 11 has a pair of left and right upper down frames 20 that extend diagonally downward and backward and branch to the left and right from the rear part of the head pipe 12, and a pair of left and right lower down frames (vehicle body frame member) 21 that, below each of these upper down frames 20, extend diagonally downward and backward and branch to the left and right from the rear part of the head pipe 12.

After extending diagonally downward and backward from the head pipe 12, the upper down frames 20 are bent so as to diminish the inclination thereof at an upper intermediate bent part 20a positioned on the inner side of the low floor part L, and then they further extend diagonally downward and backward. Hereunder, the forward portion from the upper intermediate bent part 20a of the upper down frames 20 is referred to as an upper front inclined part 20b, and the backward portion is referred to as an upper rear inclined part 20c.

The lower down frames 21 extend diagonally downward and backward from the head pipe 12 at an angle steeper than that of the upper front inclined part 20b, and they are bent at an angle with a further increased inclination, at a first bent part 21a that is positioned on the inner side of the low floor part L and diagonally upward and forward of the upper intermediate bent part 20a. Then they are bent backward at a second bent part 21b that is positioned on the lower end front side of the vehicle body frame 11. Then, the lower down frames 21 extend backward while maintaining being substantially parallel with each other, and they are bent and extend diagonally upward and backward at a third bent part 21c that is positioned diagonally downward and forward of the pivot shaft 33. Then, the rear upper ends of the lower down frames 21 are connected to the lengthwise intermediate part lower side of left and right seat rails 23.

Hereunder, the portion of the lower down frames 21 from the head pipe 12 to the first bent part 21a is referred to as a first inclined part 22a, the portion from the first inclined part 22a to the second bent part 21b is referred to as a second inclined part 22b, the portion from the second bent part 21b to the third bent part 21c is referred to as a lower end horizontal part 22c, and the portion from the third bent part 21c to the seat rail 23 is referred to as a rear inclined part 22d.

To the lower part front side of the rear inclined part of the lower down frame 21, there is connected the rear end of the upper down frame 20. As a result, in the vehicle body frame 11, there are formed a pair of left and right loop structures that each connect between the head pipe 12 and the pivot shaft 33.

To the lengthwise intermediate part upper side of the upper rear inclined part 20c of the upper down frame 20, there is connected the front end of the seat rail 23 that extends backward and upward at an angle. To the lengthwise intermediate part lower side of the left and right seat rails 23, there is connected the upper end of the rear inclined part 22d of the lower down frame 21, and with this, there are formed a pair of left and right loop structures that forms a triangular shape in side view, diagonally forward and upward of the pivot shaft 33 when seen on a side view.

Seat rails 23 extend to the close vicinity of the vehicle body rear end, and a seat 30 for a driver to sit thereon and a rear part vehicle body cover are supported on these seat rails 23. The respective frame members on the left and right in the vehicle body frame 11 are appropriately connected via a cross member (not shown in the figure).

On the rear part of the lower end horizontal part 22c of the lower down frame 21, there is swingably supported the front end part of a rear cushion unit 67 that is arranged substantially horizontal, and the rear end part of this rear cushion unit 67 is connected to the front part lower side of the swing arm 34 via a link mechanism 62.

Above the rear end part of the upper down frame 20, there are arranged gusset plates 26 that are connected to and straddle over the rear inclined part 22d of the lower down frame 21, and the motor unit 38 is supported between the left and right gusset plates 26. The motor unit 38 accommodates an electric motor (power engine) 41 within a unit case 39 that forms the exterior appearance thereof.

Above the motor unit 38, a PDU (power driver unit) 50 is arranged in close proximity thereto. The PDF 50 is arranged at the front part of the seat rails 23, and within the loop structure shaped in a triangular shape in side view, that is surrounded by the rear end part of the upper rear inclined part 20c of the upper down frame 20 and the rear inclined part 22d of the lower down frame 21.

Inside the vehicle body frame 11, there is arranged the rectangular-solid-shaped main battery 80, which is long in the lengthwise direction, so as to fit in between the upper rear inclined part 20c of the upper down frames 20, and between the second inclined parts 22b and the lower end horizontal parts 22c of the lower down frames 21. The main battery 80 is a high voltage battery of 48 to 72V for supplying electric power to the electric motor 41, and is mounted on the vehicle body frame 11 in a state of being housed within a battery case 70, which is of a rectangular sold shape similar to that of the main battery 80.

Here, reference symbol 43 in the figure denotes a front cover body that covers the periphery of the head pipe 12 from the front side, reference symbol 44 denotes a front inner cover that covers the periphery of the head pipe 12 from the rear side, reference symbol 45 denotes a floor cover that covers the periphery of the upper and lower down frames 20 and 21 from the upper side, above the low floor part L, reference symbol 46 denotes a lower cover that covers the periphery of the upper and lower down frames 20 and 21 from the lower side, below the low floor part L, and reference symbol 47 denotes a vehicle body rear part cover that covers the vehicle body rear part at rear of the low floor part L and below the seat 30.

The front cover body 43 and the front inner cover 44 are fitted with each other in the lengthwise direction to thereby form a front cover 43A that covers the vehicle body front part including the periphery of the head pipe 12. The front cover 43A is provided in a range that substantially covers from the top to the bottom of the vehicle body cover front part in the vertical direction, and that substantially covers from the front end of the vehicle body cover to the front end of the low floor part L in the lengthwise direction.

In the front cover 43A, there is provided an air inlet opening 83 that opens forward, and there is provided an air inlet duct 84 that communicates with the air inlet opening 83. The rear end part of the air inlet duct 84 is connected to the front part upper end of the battery case 70. At the rear part lower end of the battery case 70, there is provided an air exhaust opening 85. Air that has been introduced from the air inlet opening 83 into the battery case 70 through the air inlet duct 84 cools the main battery 80, and then is discharged to the outside of the case (outside of the vehicle) from the air exhaust opening 85.

The air inlet duct 84 is capable of introducing traveling airstream into the battery case 70 when the vehicle is traveling. On the other hand, it introduces outside air into the battery case 70 by the operation of a built-in electric fan 86 when the vehicle is in a stop state.

On the inner side of the air inlet duct 84 and on the upstream side of the electric fan 86, there is arranged a DC-DC converter 88, which generates a comparatively large amount of heat. On the upper side of the DC-DC converter 88, and for example, on the outer side of the air inlet duct 84, there is arranged a control unit 89 for output control of a speaker 48 that is described later. On the inner side of the low floor part L and on the upper side of the battery case 70, there is arranged a 12V sub battery 87.

In the front surface part of the front cover 43A, there is provided a recharge socket 90 to which an external power supply plug of, for example, AC100V can be connected, and on the inner side of the front cover 43A and on the front side of the head pipe 12, there is provided a recharger 91 which is capable of recharging the main battery 80 using an external power supply connected to the recharge socket 90.

90Here, the two wheeled vehicle 10 is provided with a vehicle approach alert device 40 that notifies pedestrians or other road users of approach of the vehicle, by outputting a predetermined alert sound from a sound emitter installed on the vehicle.

In the present embodiment, the speaker 48, which is a sound emitter for emitting an alert sound, is arranged on the inner side of the front cover 43A and below the lower end of the head pipe 12, and it is attached on the front side of one or both of the first inclined parts 22a of the left and right lower down frames 21. The speaker 48 is arranged within the space having a triangular shape with the front fork 15 and the first and second inclined parts 22a and 22b of the lower down frame 21 being the upper two edges thereof when viewed from a side.

The sound emission direction of the speaker 48 (sound emission direction, shown with arrow 48a in the figure) is oriented diagonally downward and forward, and in this sound emission direction 48a (diagonally downward and forward of the speaker 48), there is provided a bell-bottom-shaped sound emission duct 49 that extends diagonally downward and forward while tapering outward, along the sound emission direction 48a. The end part of the sound emission duct 49 opens to the outside of the front cover 43A, and it gives a directionality to sound to be emitted from the speaker 48 and emits the sound diagonally downward and forward of the front cover 43A.

The sound emission direction 48a of the speaker 48 is approximately oriented to the traveling direction of the two wheeled vehicle 10, and the sound of the speaker 48 can be recognized by pedestrians and other road users easily. On the other hand, the sound emission direction 48a is oriented to the direction of moving away from the head part H of the driver, and therefore, the magnitude of the sound of the speaker 48 to be heard by the driver is suppressed. The sound volume of the speaker 48 is controlled by the control unit 89 according to the vehicle speed and so forth. Electric power is supplied from the sub battery 87 to the speaker 48 and the control unit 89.

The speaker 48 and the sound emission duct 49 are positioned diagonally upward and backward of the front wheel 16. However, the portion that is diagonally upward and backward of the front wheel 16 is covered by the front fender 16a.

That is to say, since the speaker 48 is positioned on the outer circumferential side of the front fender 16*a*, rain water and so forth splashed by the front wheel 16 are unlikely to come in contact with the speaker 48 and the sound emission duct 49. There is no particular limitation to the number of speakers 48 to be installed. The outer circumferential side of the front fender refers to the radially outer side of the outer circumference part of the front fender when seen from the side.

As has been described above, the vehicle approach alert device 40 of a saddle-ridden electric vehicle in the above embodiment is one that outputs an alert sound toward the surrounding area from the speaker 48 attached on the vehicle body of the two wheeled vehicle 10, to thereby notify the surrounding area of approach of the two wheeled vehicle 10, and the speaker 48 is arranged so that the sound emission direction 48*a* is oriented diagonally downward and forward.

According to this configuration, by controlling sound emission of the sound emitter according to the traveling status, and orienting the sound emission direction 48*a* of the speaker 48 to the diagonally downward and forward direction, it is possible to efficiently transmit an alert sound to the surrounding area while appropriately utilizing ground sound reflection according to the traveling status.

Moreover, by orienting the sound emission direction 48*a* to the direction opposite to the driver, it is possible to reduce the magnitude of the alert sound to be heard by the driver.

Furthermore, the vehicle approach alert device 40 is such that the two wheeled vehicle 10 is provided with the front cover 43A that covers the periphery of the head pipe 12 of the vehicle body frame 11 thereof, and the speaker 48 is arranged inside the front cover 43A, with the sound emission direction 48*a* thereof being oriented diagonally downward and forward.

According to this configuration, by orienting the sound emission direction 48*a* of the speaker 48 to the diagonally downward and forward direction, it is possible to efficiently transmit an alert sound to the surrounding area while utilizing ground sound reflection.

Moreover, it becomes possible to arrange the speaker 48 within the front cover 43A of the two wheeled vehicle 10, the lengthwise space of which is comparatively small while taking ground reflection of an alert sound in to consideration, and it becomes possible even with a small speaker 48 to obtain a high level of alerting effect.

Furthermore, by arranging the speaker 48 distanced from the driver and orienting the sound emission direction 48*a* thereof to the direction opposite to the driver, it is possible to reduce the magnitude of the alert sound to be heard by the driver.

Moreover, the vehicle approach alert device 40 is provided with the sound emission duct 49 that extends diagonally downward and forward from the speaker 48 along the sound emission direction 48*a* thereof, and the speaker 48, on the inner side of the front cover 43A, is attached on the vehicle body frame 11, and emits sound to the outside of the front cover 43A through the sound emission duct 49.

According to this configuration, while arranging the speaker 48 inside the front cover 43A, an alert sound can be emitted with a directionality efficiently through the sound emission duct 49 to the outside of the front cover 43A, and it is possible to increase the level of alerting effect and further reduce the magnitude of the alert sound to be heard by the driver.

Moreover, the vehicle approach alert device 40 is such that the speaker 48 is arranged below the head pipe 12.

According to this configuration, the speaker 48 can be arranged distanced from the driver and in close proximity to the ground, using the space below the head pipe 12, which has a comparatively small number of components, and it is possible to reduce the magnitude of an alert sound to be heard by the driver and transmit the alert sound to the surrounding area efficiently, also utilizing ground sound reflection.

Moreover, the vehicle approach alert device 40 is such that the speaker 48 is arranged on the outer circumferential side of the front fender 16*a* of the two wheeled vehicle 10.

According to this configuration, it is possible to arrange the speaker 48 distanced from the driver, and by arranging the speaker 48 at a position that receives a comparatively small amount of mud splash caused by the front wheel 16, it is also possible to make an advantageous arrangement for waterproofing the speaker 48.

Furthermore, the vehicle approach alert device 40 is characterized in that it is provided with the lower down frames 21 each extending diagonally backward and downward from the head pipe 12; on the head pipe 12 there is steerably supported the front fork 15 that extends diagonally forward and downward and that suspends the front wheel 16; and the speaker 48 is arranged in front of the first and second inclined parts 22*a* and 22*b* of the lower down frame 21 when viewed from the side, and at the rear of the front fork 15.

According to this configuration, with the speaker 48 being arranged, below the head pipe 12, within the space having the triangular shape in side view, with the first and second inclined parts 22*a* and 22*b* of the lower down frame 21 and the front fork 15 being the two edges thereof, it is possible to efficiently arrange the speaker 48 below the head pipe 12, and protection of the speaker 48 can be achieved easily.

Reference symbol 48' in the figure denotes a speaker arranged on the front edge of the front cover 43A, and reference symbol 48*a*' denotes a sound emission direction of this speaker 48'. The sound emission direction 48*a*' of the speaker 48' is oriented diagonally downward and forward, and the sound thereof is directly emitted toward the outside of the front cover 43A (toward the front side of the vehicle and in the traveling direction). According also to this configuration, in addition to the action and effect similar to those described above, sound of the speaker 48' can be efficiently emitted to the outside of the cover with the sound emission duct having been eliminated.

<Second Embodiment>

Figure 2:
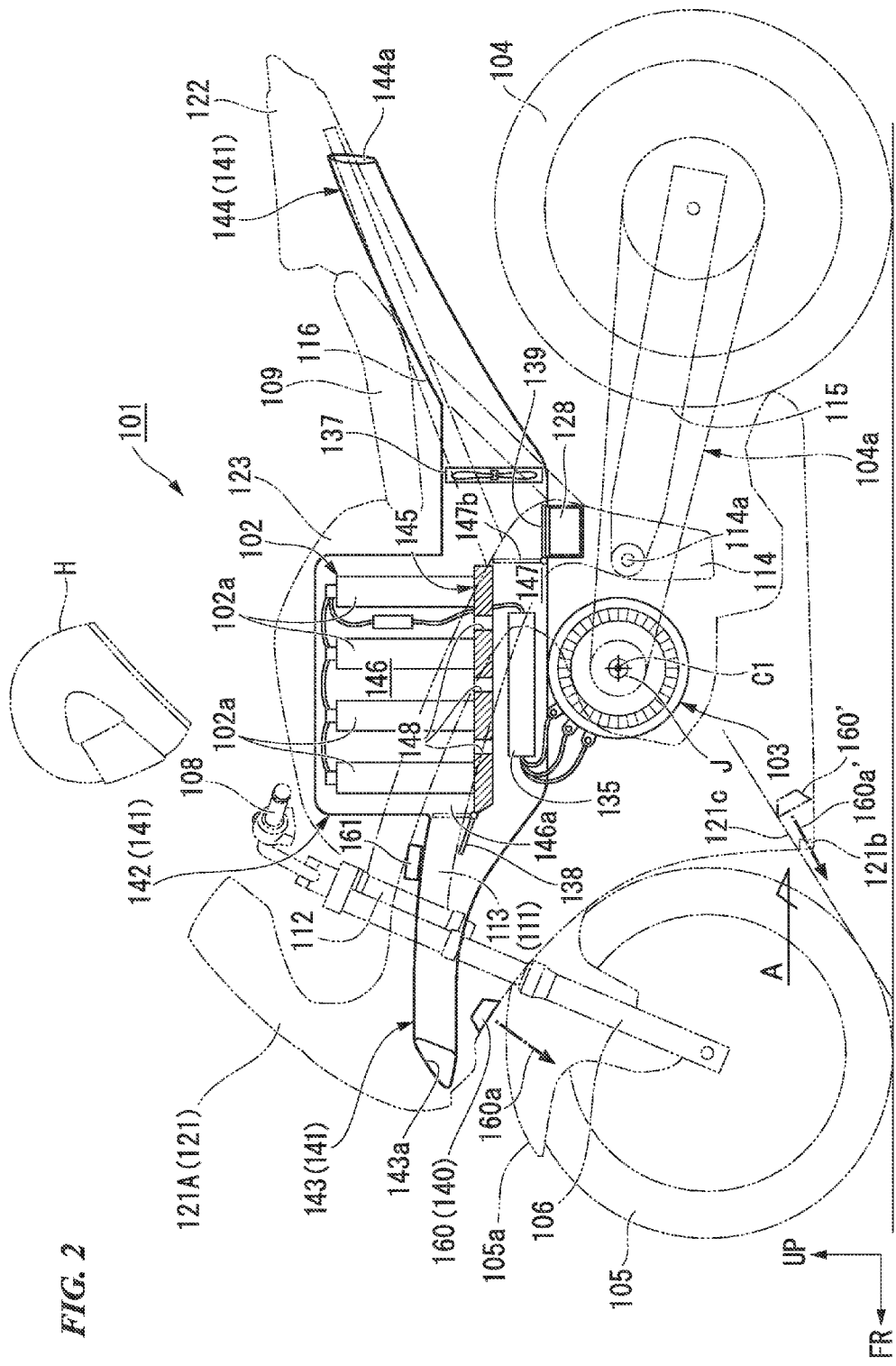
FIG. 2 is a left side view of a two wheeled vehicle to which a vehicle approach alert device for a saddle-ridden electric vehicle in a second embodiment of the present invention is applied.
Figure 3:
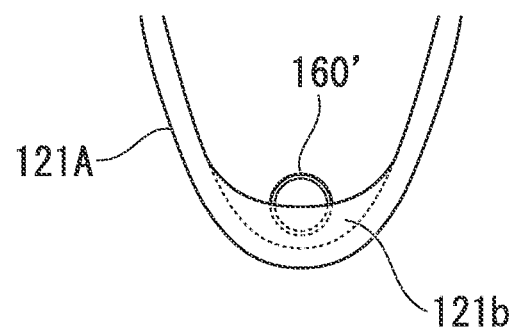
FIG. 3 is a view on arrow A of FIG. 2.

Next, a second embodiment of the present invention is described, with reference to FIG. 2 and FIG. 3.

A two wheeled vehicle 101 shown in FIG. 2 that serves as a saddle-ridden electric vehicle is such that: at the center upper part of the vehicle body thereof there is mounted a main battery 102 for traveling; at the center lower part of the vehicle body there is mounted a motor unit 103 for traveling; the motor unit 103 is driven with electric power supplied from the main battery 102; and the driving force is transmitted to a rear wheel 104, which is a driving wheel, for traveling. Arrow FR in the figure denotes the front side of the vehicle and the arrow UP denotes the upper side of the vehicle.

The two wheeled vehicle 101 has an aspect of a sport type motorcycle, which allows the driver to carry out knee gripping, and a front wheel 105 is axially supported at the lower end part of a pair of left and right portions of a front fork 106, while the upper part of the front fork 106 with the left and right portions is steerably and pivotably supported on a head pipe 112 at the front end of the vehicle body frame 111 via a steering stem (not shown in the figure). At the upper part of the steering stem (or the front fork 106), there is attached a steering handle bar 108.

A pair of left and right main frames 113 extend diagonally downward and backward from the head pipe 112, and a pivot frame 114 extends downward from the rear end part of the left and right main frames 113. On the left and right pivot frames 114, via a pivot shaft 114a, there is vertically swingably and pivotably supported the front end part of a swing arm 115, and at the rear end part of the swing arm 115, there is axially supported the rear wheel 104.

The vehicle body front part of the two wheeled vehicle 101 is covered by a cowling 121 from the front side, the side, and the lower side thereof. Hereunder, the portion of the cowling 121 that covers the periphery of the head pipe 112 (the portion that faces the front side of the vehicle, and the portion that is fitted to this portion from the rear side) is referred to as a front cover 121A.

A seat frame 116 extends diagonally upward and backward from the rear end part of each of the left and right main frames 113 and from each of the left and right pivot frames 114. On each seat frame 116, there is supported a seat 109 for the driver to sit thereon. The periphery of the seat frames 116 is covered by a seat cowling 122. The vehicle frame 111 including the seat frames 116 is integrally formed with several types of metal members that are connected by means of welding and fastening. On the front side of the seat 109, there is arranged a seat front cover 123 that protrudes upward from the upper edge of the left and the right main frames 113. The seat front cover 123 is to be sandwiched by both of knees of a passenger (driver) that is seated on the seat 109.

The main battery 102 comprises, for example, a plurality of (four in the figure) electrical batteries 102a lined up lengthwise, and these batteries are connected in series to generate a high voltage between 48V to 72V. Each electrical battery 102a is an energy storage that is capable of appropriately recharging/discharging, and it is composed of a lithium ion battery, a nickel hydride battery, a lead battery, or the like for example.

The main battery 102 is stationarily supported on the vehicle body frame 111 via a duct 141, in a state with the lower part front side thereof fitted in between the left and right main frames 113.

Immediately beneath the main battery 102, there is positioned the motor unit 103, and this motor unit 103 is stationarily supported on the vehicle body frame 111. The motor unit 103 has a rotation axis line C1 along the left-right direction, and a driving shaft J of this motor unit 103 and the rear wheel 104 are linked only via a chain-type power transmission mechanism 104a for example. The power transmission mechanism 104a may be of a belt type or a shaft type.

The motor unit 103 performs variable speed driving by means of VVVF (variable voltage variable frequency) control for example, to drive the rear wheel 104 only via the power transmission mechanism 104a. However, the rear wheel 104 may be driven via a manual/automatic transmission and a clutch. Moreover, reference symbol 135 in the figure denotes a control unit that includes an ECU (electric control unit) and a PDU (power driver unit), which is a motor driver.

The duct 141 extends from the front end part to the rear end part of the vehicle body and is to supply outside air along the lengthwise direction, and it integrally has an electrical component housing part 142 that is formed so as to expand the flow passage at the lengthwise intermediate part thereof, an air inlet duct 143 that extends forward from the front end lower part of this electrical component housing part 142, and an air exhaust duct 144 that extends backward from the rear end lower part of the electrical component housing part 142.

The electrical component housing part 142 is positioned between the left and right main frames 113 and above the motor unit 103, and the upper part thereof is fitted into the seat front cover 123. The electrical component housing part 142 has a substantially horizontal plate-shaped bulkhead 145 that is stationarily provided on the lower part inner side thereof. The space above this bulkhead 145 serves as a battery housing part 146 for housing the main battery 102, and the space below the bulkhead 145 serves as a driver housing part 147 for housing the control unit 135.

While the tube-forming portion of the duct 141 is composed, for example, of a resin molded product, the bulkhead 145 is composed of a member that has comparatively high thermal conductivity such as aluminum alloy. The bulkhead 145 serves also as a heat sink of the main battery 102, and the main battery 102 is mounted directly on this bulkhead 145. In the bulkhead 145 there are formed a plurality of communication holes 148 that communicate between the respective housing parts 146 and 147. The opening area of the communication holes 148 is made sufficiently smaller than the flow passage areas of the respective housing parts 146 and 147.

At the front end part of the bulkhead 145 there is provided a front louver 138 that opens and closes an upper air inlet opening 146a at the front end of the battery housing part 146. Meanwhile, at the rear end part of the lower wall of the electrical component housing part 142 there is provided a rear louver 139 that opens and closes a lower air exhaust opening 147b at the rear end of the driver housing part 147. The respective louvers 138 and 139 are electrically operated, and operations thereof are controlled by the control unit 135 based on temperature information and so forth of the main battery 102.

The air inlet duct 143 extends forward within the cowling 121 (front cover 121A), and the front end opening thereof (air inlet opening 143a) opens toward the front side of the vehicle (outer side of the cowling), at the front end part of the cowling 121. The air inlet opening 143a functions as a traveling airstream introduction opening when the vehicle is traveling.

The air inlet duct 143 branches to the left and right so as to avoid the vehicle body frame 111 (head pipe 112), or it extends forward while being biased to either the left or right. The air inlet duct 143 intersects with the front fork 106 and the head pipe 112 when seen in the vehicle side view.

The air exhaust duct 144 extends backward within the seat cowling 122, and the rear end opening thereof (air exhaust opening 144a) opens at the rear end part of the seat cowling 122, toward the rear side of the vehicle. Within, for example, the base end part (front end part) of the air exhaust duct 144, there is provided a fan 137 that force-supplies the air within the duct 141 from the air inlet opening 143a side to the air exhaust opening 144a side.

Each of the louvers 138 and 139 closes the upper air inlet opening 146a and closes the lower air exhaust opening 147b when the main battery 102 is at a low temperature (when the temperature of the main battery 102 is lower than a predetermined temperature that is suitable for recharging/discharging). Thereby, the outside air taken into the duct 141 first flows only into the driver housing part 147 to cool and remove heat from the control unit 135, and then it flows into the battery housing part 146 through the respective communication holes 148. It then flows around and heats the respective electrical batteries 102a, and then is discharged to the outside of the duct 141.

On the other hand, the respective louvers 138 and 139 open the upper air inlet opening 146a and the lower air exhaust opening 147b when the main battery 102 is at a high temperature (when it is greater than or equal to the predetermined temperature). As a result, the outside air taken into the duct 141 flows respectively into the battery housing part 146 and the driver housing part 147 to cool the main battery 102 and the control unit 135 respectively, and then it is discharged to the outside of the duct 141. When the lower air exhaust opening 147b is opened, the rear louver 139 blocks the upper opening of the concaved part that houses the 12V sub battery 128.

Here, the two wheeled vehicle 101 is provided with a vehicle approach alert device 140 that notifies pedestrians or other road users of approach of the vehicle, by outputting a predetermined alert sound from a sound emitter installed on the vehicle.

In the present embodiment, a speaker 160, which is a sound emitter for emitting an alert sound, is arranged on the inner side of the front cover 121A and below the lower end of the head pipe 112, and it is attached on the inner surface side of the front cover 121A for example. The speaker 160 is positioned approximately immediately above the front wheel 105 when seen in the side view (on the outer side of the outer circumferential part of the front fender 105a).

The sound emission direction of the speaker 160 (sound emission direction, shown with arrow 160a in the figure) is oriented diagonally downward and forward, and the sound thereof is directly emitted toward the outside of the front cover 121A (toward the front side of the vehicle and in the traveling direction).

The sound emission direction 160a of the speaker 160 is approximately oriented to the traveling direction of the two wheeled vehicle 101, and the sound of the speaker 160 can be recognized by pedestrians and other road users easily. On the other hand, the sound emission direction 160a is oriented to the direction of moving away from the head part H of the driver, and therefore, the magnitude of sound to be heard by the driver is suppressed. The sound volume of the speaker 160 is controlled by the control unit 161 above the air inlet duct 143 according to the vehicle speed and so forth. Electric power is supplied from the sub battery 128 to the speaker 160 and the control unit 161.

The speaker 160 is positioned above the front wheel 105. However, the area above the front wheel 105 is covered by the front fender 105a, and mud splash caused by the front wheel 105 is unlikely to come in contact with the speaker 160, which is positioned on the back side thereof. There is no particular limitation to the number of speakers 160 to be installed.

The control unit 161 for output control of the speaker 160 is attached to the upper wall part of the rear part of the air inlet duct 143 (the portion at the rear of the head pipe 112 when seen in side view).

As has been described, as with the first embodiment, the vehicle approach alert device 140 for a saddle-ridden electric vehicle in the above embodiment is also such that the speaker 160 that outputs an alert sound is arranged within the front cover 121A that covers the periphery of the head pipe 112 while the sound emission direction 160a thereof is oriented diagonally downward and forward, and therefore, it is possible to efficiently transmit an alert sound of the speaker 160 to the surrounding area while utilizing ground sound reflection. Moreover, with the speaker 160 being distanced from the driver and the sound emission direction 160a being oriented to the direction opposite to the driver, it is possible to reduce the magnitude of sound that is to emitted by the speaker 160 to be heard by the driver.

Furthermore, the vehicle approach alert device 140 is such that, with the speaker 160 being arranged below the head pipe 112, the speaker 160 can be arranged distanced from the driver, and it is possible to reduce the magnitude of an alert sound to be heard by the driver and transmit the alert sound to the surrounding area efficiently, also utilizing ground sound reflection.

Moreover, the vehicle approach alert device 140 is such that with the speaker 160 being arranged on the outer circumferential side of the front fender 105a of the two wheeled vehicle 101, it is possible, with use of the space below the head pipe 112, which has a comparatively small number of components, to arrange the speaker 160 distanced from the driver, and with the speaker 160 being arranged at a position where mud splash and the like caused by the front wheel 105 are comparatively less likely, it is possible to make an advantageous arrangement for waterproofing the speaker 160.

Moreover, the vehicle approach alert device 140 is such that on the head pipe 112, there is steerably supported the front fork 106 that extends diagonally forward and downward and that suspends the front wheel 105, and the speaker 160 is arranged in front of the front fork 106 when viewed from the side. Thereby, the speaker 160 can be arranged further distanced from the driver, and it is possible to reduce the magnitude of an alert sound to be heard by the driver.

Reference symbol 160' in the figure denotes a speaker arranged at the lower end of the front cover 121A, reference symbol 160a' denotes the sound emission of this speaker 160', reference symbol 121b denotes a protection wall (waterproofing wall) that is provided at the lower end of the front cover 121A and immediately in front of the speaker 160', and reference symbol 121c denotes a tangent line of the tire that extends from the outer circumferential edge on the lower part rear side of the front wheel 105 and that passes through the upper end of the protection wall 121b. The sound emission direction 160a' of the speaker 160' is oriented diagonally downward and forward, and the sound thereof is directly emitted toward the outside of the front cover 121A (toward the front side of the vehicle and in the traveling direction).

The speaker 160' is positioned at the rear of the protection wall 121b and below the tire tangent line 121c when viewed from the side. Moreover, in the front view (front side view) shown in FIG. 3, the lower part of the speaker 160' and the upper part of the protection wall 121b are overlapping with each other.

According to this configuration, in addition to the action and effect similar to those described above, it is possible to enable better use of ground sound reflection to efficiently transmit emitted sound of the speaker 160' to the surrounding area, while keeping mud splash and the like to the speaker 160' caused by the front wheel 105 at a comparatively low level with the protection wall 121b. Further, with the speaker 160' being positioned further distanced from the driver, it is possible to further reduce the magnitude of sound that is emitted from the speaker 160' to be heard by the driver. Moreover, by also providing the speaker 160 and having both of the respective speakers 160 and 160' emit a sound together with an adjusted sound distribution, it is also possible to improve the efficiency of sound transmission to the surrounding area. As with the first embodiment, a sound emission duct may be provided for both or either one of the speakers 160 and 160'.

<Third Embodiment>

Figure 4:
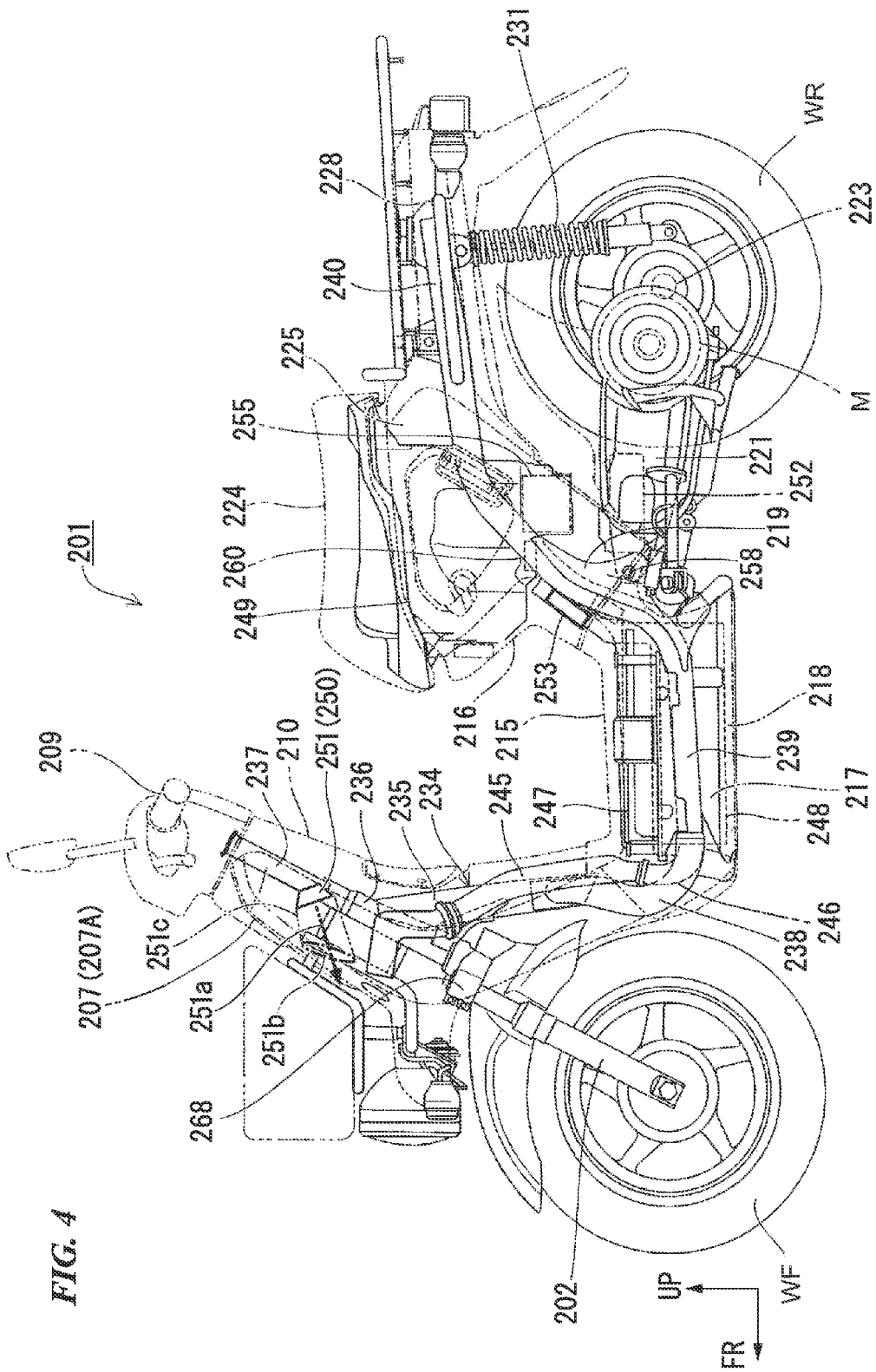
FIG. 4 is a left side view of a two wheeled vehicle to which a vehicle approach alert device for a saddle-ridden electric vehicle in a third embodiment of the present invention is applied.

Next, a third embodiment of the present invention is described, with reference to FIG. 4.

A two wheeled vehicle 201 shown in FIG. 4 that serves as a saddle-ridden electric vehicle is a scooter type vehicle having a low floor 215, that travels in a manner such that a rear wheel WR axially supported on an axle 223 is rotation-driven with rotation power exerted by an electric motor (power engine) M that is built into a swing arm 221. Arrow FR in the figure denotes the front side of the vehicle and the arrow UP denotes the upper side of the vehicle.

A vehicle body frame 234 of the two wheeled vehicle 201 is provided with: a head pipe 236 that is tilted so the upper part thereof is positioned on the rear side; a main frame 235 that extends diagonally backward and downward from this head pipe 236; a pair of left and right under frames 239 that each connects to the lower part of this main frame 235 via a bent part 238 and that extend backward; and a pair of left and right rear frames 240 that each integrally connects to the rear end of each under frame 239 and that extend diagonally backward and upward.

The head pipe 236 axially and turnably supports a steering stem 237, and on the upper end of this steering stem 237, there is fixed a steering handle bar 209. On the other hand, on the lower end of the steering stem 237, there is fixed an under bracket 268 that supports the upper end part of a front fork 202 with a pair of left and right portions. On the lower end part of each portion of the front fork 202, there is axially supported a front wheel WF.

On the front part of each rear frame 240 of the vehicle body frame 234, there is provided each of a pair of left and right pivot plates 219. On each pivot plate 219 there is swingably borne via a pivot shaft 258, the front part of the swing arm 221. The swing arm 221 is of a cantilever type that uses an arm on the vehicle widthwise left side only to axially support the rear wheel WR. Between the rear part of the left side rear frame 240 and the rear part of the swing arm 221, there is provided a rear cushion unit 231. Within the swing arm 221, in addition to the electric motor M, there are collectively arranged a centrifugal clutch and a deceleration mechanism (neither shown in the figure) serving as a mechanism for engaging/disengaging rotation driving force, and a PDU (power drive unit) 252 that controls output of the electric motor M.

The two-wheeled vehicle 201 is provided with: a front cover body 207 that covers the periphery of the head pipe 236 from the front side; a leg shield 210 that covers the periphery of the head pipe 236 from the rear side; the low floor 215 that continues to the lower rear side of the leg shield 210 and that covers a battery case 247 from the upper side so as to have the feet of a passenger sitting on a seat 224 placed thereon; a pair of left and right floor side covers 217 that extend perpendicularly downward from the outer side of the low floor 215 so as to cover the outer side of each under frame 239; an under cover 218 that is provided to join the lower edges of the respective floor side covers 217; a seat lower front part cover 216 that rises from the rear end of the low floor 215 so as to cover the space below the seat 224 from the front side; a pair of left and right side covers 225 that each continues to the outer rear side of the seat lower front part cover 216 so as to cover the space below the seat 224 from both sides; and a rear cover 228 that continues to the rear side of each side cover 225 so as to cover the rear wheel WR from the upper side.

The front cover body 207 that faces the vehicle body front side and the leg shield 210 that is fitted to this from the rear side, are integrally connected with each other, and they form a front cover 207A that covers the vehicle body front part including the periphery of the head pipe 236.

The battery case 247 houses a high voltage battery 248 of 48V to 72V for supplying electric power to the electric motor M.

To the front part of the battery case 247 there are connected, via connection tubes 246, the downstream side end parts of left and right cooling air introduction ducts 245. The respective cooling air introduction ducts 245 extend upward along the main frame 235 so as to sandwich, within the front cover 207A, the main frame 235 from the outer sides, and then they are bent forward. Further, the each end opening thereof opens toward the front side within the front cover 207A.

On the rear part upper surface of the battery case 247, there is attached a cooling fan 253, and with the operation of this cooling fan 253, the air that has been introduced from the cooling air introduction duct 245 is introduced into the battery case 247 to cool the high voltage battery 248 within the battery case 247.

Here, the two wheeled vehicle 201 is provided with a vehicle approach alert device 250 that notifies pedestrians or other road users of approach of the vehicle, by outputting a predetermined alert sound from a sound emitter installed on the vehicle.

In the present embodiment, a speaker 251, which is a sound emitter for emitting an alert sound, is arranged on the inner side of the front cover 207A, above the upper end of the head pipe 236, and on the side of the steering stem 237, and it is attached on the head pipe 236 via a stay or the like.

The sound emission direction of the speaker 251 (sound emission direction, shown with arrow E) is oriented diagonally downward and forward, and at the portion of the front cover 207A positioned in the sound emission direction, there is appropriately formed an opening 251b for emitting a sound of the speaker to the outer side of the front cover 207A (to the vehicle front side, and in the traveling direction).

As a result, the sound emission direction of the speaker is substantially oriented to the traveling direction of the two wheeled vehicle, and the sound of the speaker is likely to be recognized by pedestrians and other road users. Further, with the sound emission direction being oriented in the direction of moving away from the head part of the driver (not shown in the figure), the magnitude of the speaker sound to be heard by the driver can be suppressed. There is no particular limitation to the number of the speakers 251 and the openings 251b to be installed.

Below the seat 224, there is arranged a goods storage box 249 that can be opened or closed by this seat 224, and at the bottom part of this goods storage box 249, there is arranged a control unit 260 for output control of a 12V low voltage battery 255 and the speaker 251. The sound volume of the speaker is controlled by this control unit 260 according to the vehicle speed and so forth.

As has been described, as with the first embodiment, the vehicle approach alert device 250 for a saddle-ridden electric vehicle in the above embodiment is also such that the speaker 251 that outputs an alert sound is arranged within the front cover 207A that covers the periphery of the head pipe 236 while the sound emission direction 251a thereof is oriented diagonally downward and forward, and therefore, it is possible to efficiently transmit an alert sound of the speaker 251 to the surrounding area while utilizing ground sound reflection. Moreover, with the speaker 251 being distanced from the driver and the sound emission direction 251a being oriented to the direction opposite to the driver, it is possible to reduce the magnitude of sound that is to emitted by the speaker 251 to be heard by the driver. Further, as with the first embodiment, a sound emission duct 251c may be provided between the speaker 251 and the opening 251b.

<Fourth Embodiment>

Figure 5:
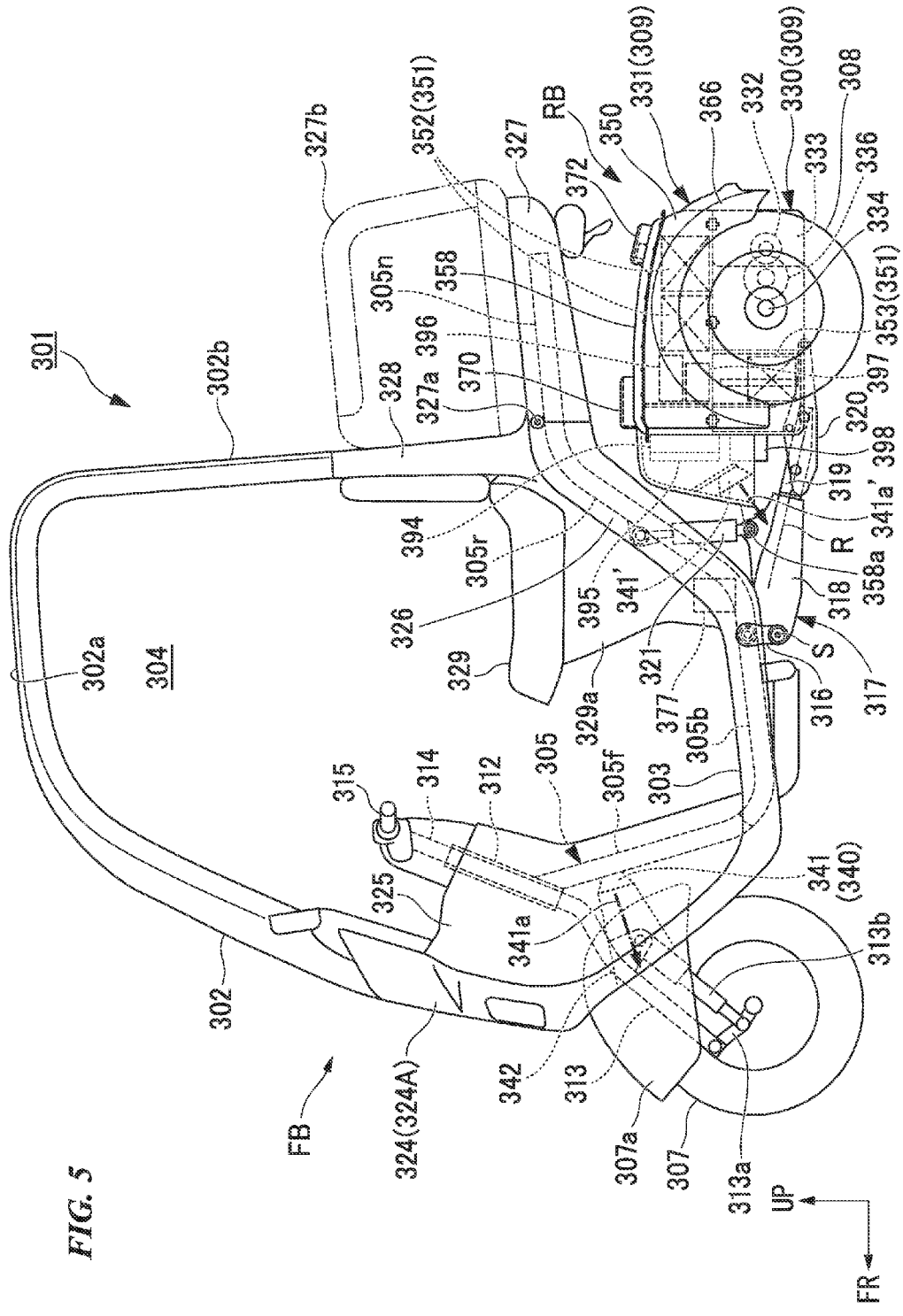
FIG. 5 is a left side view of a three wheeled vehicle to which a vehicle approach alert device for a saddle-ridden electric vehicle in a fourth embodiment of the present invention is applied.

Next, a fourth embodiment of the present invention is described, with reference to FIG. 5.

A three wheeled vehicle 301 shown in FIG. 5 that serves as a saddle-ridden electric vehicle is provided with a roofed cabin 304 that has a wind screen 302 at the front part thereof, and a low floor 303 at the bottom part thereof. The cabin 304 is supported on a front vehicle body FB that is provided with a single front wheel (steering wheel) 307, and this vehicle front body FB is left-right-swingably (rollably) connected to a rear vehicle body RB that is provided with a pair of left and right rear wheels (driving wheels) 308. That is to say, the three wheeled vehicle 301 is formed as a swing type vehicle in which the front and rear vehicle bodies FB and RB can swing relatively to each other.

A vehicle body frame 305 that forms the framework of the front vehicle body FB is such that the front end part thereof has a head pipe 312 that is inclined with respect to the perpendicular direction provided thereon, and into this head pipe 312, there is turnably inserted a steering stem 314. To the lower end part of the steering stem 314, there is integrally connected the upper end part of a front fork 313 with a pair of left and right portions. At the upper end of the steering stem 314, there is integrally attached a steering handle bar 315.

A pair of left and right trailing arms 313a extend diagonally downward and backward respectively from the lower end of each of the left and right portions of the front fork 313, and the front wheel 307 is axially supported on the end part of these left and right trailing arms 313a. Between the left and right trailing arms 313a and the left and right portions of the front fork 313, there are intervened a pair of left and right cushion units 313b. A front fender 307a is attached on the left and right portions of the front fork 313.

The vehicle body frame 305 has: a single front part frame (vehicle body frame member) 305f that extends diagonally backward and downward from the lower part rear side of the head pipe 312; a pair of left and right lower part frames 305b that branch to the left and right from the lower end of the front part frame 305f and that extend backward along the low floor 303 while being maintained parallel to each other; a pair of left and right rear part frames 305r that are bent and extend diagonally backward and upward from the rear end of the left and right lower part frames 305b; and a pair of left and right carrier frames 305n that are bent and extend diagonally upward and backward from the rear end of the left and right rear part frames 305.

To the rear part of the left and right lower part frames 305b there is connected, via a link member 316, the front end part of a swing joint 317 that swingably connects the rear vehicle body RB. The link member 316 projects downward of the left and right lower part frames 305b, and it is allowed to swing forward and backward by a predetermined angle. On the lower end of this link member 316, there is vertically swingably supported, via a swing shaft S along the vehicle widthwise direction, the front end part of the swing joint 317 that extends lengthwise.

The swing joint 317 is provided with a joint case 318 with the front end thereof supported on the link member 316, and a joint shaft 319 that is inserted in and supported on the rear end side of this joint case 318 while being allowed to turn about the axial line R that is angled diagonally backward and downward.

The joint shaft 319 is connected, via a hanger plate 320, to the lower part front side of a power unit 309 that is a prime mover of the three wheeled vehicle 301. The power unit 309 and the left and right rear wheels 308 supported on both sides thereof collectively form the rear vehicle body RB. That is to say, the front and rear vehicle bodies FB and RB are connected so as to be able to relatively swing about the axial line R via the swing joint 317.

To the upper part of the joint case 318, there is connected the lower end of a rear cushion 321, and the upper end of this rear cushion 321 is connected to the left and right rear part frames 305r. As a result, there is formed a rear suspension that vertically swings the swing joint 317 and the rear vehicle body RB with respect to the front vehicle body FB.

A vehicle cover provided for the front vehicle body FB has: a front cover body 324 that covers the periphery of the head pipe 312 from the front side; a front inner cover 325 that covers the periphery of the head pipe 312 from the rear side; the low floor 303 that covers the periphery of the left and right lower part frames 305b; a rear part cover 326 that covers the periphery of the left and right rear part frames 305r; and a carrier 327 that covers the periphery of the left and right carrier frames 305n.

The front cover body 324 and the front inner cover 325 are fitted with each other in the lengthwise direction to thereby form a front cover 324A that covers the vehicle body front part including the periphery of the head pipe 312. The front cover 324A is provided in a range that spans from the lower end of the wind screen 302 to the front end of the low floor 303, and it forms the front part lower side of the cabin 304. The upper part of the cabin 304 is formed with the wind screen 302, a roof 302a, and a roof rear supporting part 302b. The lower part of the cabin 304 is formed with the low floor 303 and the rear part cover 326. On the rear end of the rear part cover 326 there is provided, in a standing condition, a carrier front wall part 328 that continues to the lower side of the roof rear supporting part 302b.

Inside the cabin 304 and in front of the carrier 327, there is arranged a seat 329 for a passenger to sit thereon, and this seat 329 is supported on the seat lower cover 329a that is provided so as to protrude from the rear part cover 326 to the inner side of the cabin 304.

The carrier 327 and the carrier frames 305n, via a hinge shaft 327a along the vehicle width direction that is provided on the base part side (front end side) thereof, are turnably connected to the rear part cover 326 and the rear part frames 305r. As a result, the carrier 327 and the carrier frames 305n can turn between the usage state where it is arranged substantially horizontally, and the storage state where it stands up substantially vertically. With these carrier 327 and the carrier frames 305n being in the storage state, it becomes easy to perform maintenance work on the power unit 309 positioned below them. Reference symbol 327b in the figure denotes a goods storage box that can be attached on the carrier 327.

The power unit 309 is provided with a motor unit 330 that supports an axle 334 of the left and right rear wheels 308, and a battery unit 331 that is arranged and fixed on the upper part of the motor unit 330.

The motor unit 330 has an electric motor (power engine) 332 for traveling that drives the left and right rear wheels 308, and a differential mechanism (not shown in the figure) that engages with the electric motor 332 via a counter gear 336, and these are housed within a motor case 333. On the lower part front side of the motor case 333, there is fixed the hanger plate 320.

The battery unit 331 is provided with a battery case 350 that integrally continues to the motor case 333, and, for example, a lithium ion type battery 351 housed within this battery case 350.

The battery 351 is formed separately, for example, as a pair of front and rear upper batteries 352 positioned above the axle 334 of the left and right rear wheels 308, and a lower battery 353 that is dropped into the space between the left and right rear wheels 308 and in front (or at rear) of the axle 334. With these respective batteries 352 and 353 being connected in series, a high voltage of 48V to 72V is generated.

An upper lid body 358 of the battery case 350 is such that at the front part thereof, there is provided an air inlet duct 370, and on the upper rear side, there is provided an air exhaust duct 372 having a built-in cooling fan. The outside air that has been introduced from the air inlet duct 370 into the case flows around and cools the battery 351, and then it is discharged to the outside of the case from the air exhaust duct 372.

On both sides of the battery case 350 there are integrally provided left and right rear fenders 366 that cover the upper outer circumferences of the left and right rear wheels 308.

At the rear end part of the low floor 303 and on the inner side of the lower end part of the seat lower cover 329a, there is housed a 12V sub battery 377 that supplies electric power to 12V auxiliary devices and control devices.

On the front wall outer surface of the battery case 350 there is attached a DC-DC converter 394 that lowers the voltage of the battery 351 and recharges the sub battery 377. On the front surface of the DC-DC converter 394 there is provided a vertical heat release fin 395.

On the inner side of the battery case 350 and in front of the upper batteries 352, there are housed a contactor 396 that switches the driving circuit of the electric motor 332 ON and OFF, and a battery managing unit (BMU) 397 that is arranged below this contactor 396 and that performs recharge and discharge control of the battery 351.

The control unit 398 that is arranged on the front wall outer surface of the motor case 333 and below the DC-DC converter 394 integrally has: a power drive unit (PDU) that serves as a switching unit (driver) for driving the electric motor 332; and an ECU that controls the battery managing unit 397 and the power drive unit (neither shown in the figure).

The ECU receives inputs of accelerator throttle open signals from an accelerator grip provided on the steering handle bar 315, and the battery managing unit 397 and the power drive unit are controlled based on these accelerator throttle open signals. The ECU receives not only accelerator throttle open signals but also signals from various sensors, and it outputs control signals of various auxiliary devices.

Electric power output from the battery 351 is supplied to the power drive unit via the contactor 396 that operates in synchronization with a main switch (not shown in the figure), and after being converted from a direct current to a three-phase alternating current in this power drive unit, it is supplied to the electric motor 332, which is a three-phase alternating current motor. Moreover, electric power output from the battery 351 has its voltage lowered via the DC-DC converter 394, and is supplied also to the sub battery 377.

The recharging/discharging status and the temperature of the battery 351 are monitored by the battery managing unit 397, and this information is shared with the ECU. The ECU receives, in addition to accelerator throttle open signals, inputs of signal information from various types of sensors, and the ECU performs drive control of the electric motor 332 via the power drive unit, based on this information. The battery 351 can be recharged by supplying electric power from an external power supply for example. An inverter may be separately provided when recharging the battery 351 from an AC 100V commercial power supply.

Here, the three wheeled vehicle 301 is provided with a vehicle approach alert device 340 that notifies pedestrians or other road users of approach of the vehicle, by outputting a predetermined alert sound from a sound emitter installed on the vehicle.

In the present embodiment, a speaker 341, which is a sound emitter for emitting an alert sound, is arranged on the inner side of the front cover 324A and below the lower end of the head pipe 312, and it is attached on the front side of the front part frame 305f. The speaker 341 is arranged within the space having a triangular shape with the front fork 313 and the cushion, and the front part frame 305f being the upper two edges thereof when viewed from a side.

The sound emission direction of the speaker 341 (sound emission direction, shown with arrow 341a in the figure) is oriented diagonally downward and forward, and in this sound emission direction 341a (diagonally downward and forward of the speaker 341), there is provided a bell-bottom-shaped sound emission duct 342 that extends diagonally downward and forward while tapering outward, along the sound emission direction 341a. The end part of the sound emission duct 342 opens to the outside of the front cover 324A, and it gives a directionality to sound to be emitted from the speaker 341 and emits the sound diagonally downward and forward of the front cover 324A.

The sound emission direction 341a of the speaker 341 is approximately oriented to the traveling direction of the three wheeled vehicle 301, and the sound of the speaker 341 can be recognized by pedestrians and other road users easily. On the other hand, the sound emission direction 341a is oriented to the direction of moving away from the head part (not shown in the figure) of the driver, and therefore, the magnitude of the sound of the speaker 341 to be heard by the driver is suppressed. The sound volume of the speaker 341 is controlled by the control unit 398 according to the vehicle speed and so forth.

The speaker 341 and the sound emission duct 342 are positioned diagonally upward and backward of the front wheel 307. However, the area diagonally upward and the backward of the front wheel 307 is covered by the front fender 307a, and therefore, rain water and so forth splashed by the front wheel 307 are unlikely to come in contact with the speaker 341 and the sound emission duct 342 positioned on the back side thereof. There is no particular limitation to the number of speakers 341 to be installed.

As has been described, as with the first embodiment, the vehicle approach alert device 340 for a saddle-ridden electric vehicle in the above embodiment is also such that the speaker 341 that outputs an alert sound is arranged within the front cover 324A that covers the periphery of the head pipe 312 while the sound emission direction 341a thereof is oriented diagonally downward and forward, and therefore, it is possible to efficiently transmit an alert sound of the speaker 341 to the surrounding area while utilizing ground sound reflection. Furthermore, with the speaker 341 being distanced from the driver and the sound emission direction 341a being oriented to the direction opposite to the driver, it is possible to reduce the magnitude of sound that is to emitted by the speaker 341 to be heard by the driver.

Moreover, the vehicle approach alert device 340 is provided with the sound emission duct 342 that extends diagonally downward and forward from the speaker 341 along the sound emission direction 341a. The speaker 341 is attached, within the front cover 324A, on the vehicle body frame 305, and it emits a sound to the outside of the front cover 324A through the sound emission duct 342. As a result, while the speaker 341 is arranged within the front cover 324A, an alert sound can be efficiently emitted with a directionality to the outside of the front cover 324A from the sound emission duct 342, and it is possible to increase the level of alerting effect and reduce the magnitude of the alert sound to be heard by the driver.

Furthermore, the vehicle approach alert device 340 is such that, with the speaker 341 being arranged below the head pipe 312, the speaker 341 can be arranged distanced from the driver, and it is possible to reduce the magnitude of an alert sound to be heard by the driver and transmit the alert sound to the surrounding area efficiently, also utilizing ground sound reflection.

Moreover, the vehicle approach alert device 340 is such that with the speaker 341 being arranged on the outer circumferential side of the front fender 307*a* of the three wheeled vehicle 301, it is possible, with use of the space below the head pipe 312, which has a comparatively small number of components, to arrange the speaker 341 distanced from the driver, and with the speaker 341 being arranged at a position where mud splash and the like caused by the front wheel 307 are comparatively less likely, it is possible to make an advantageous arrangement for waterproofing the speaker 341.

The vehicle approach alert device 340 is provided with the front part frame 305*f* that extends diagonally backward and downward from the head pipe 312. On the head pipe 312 there is steerably supported the front fork 313 that extends diagonally forward and downward and that suspends the front wheel 307, and the speaker 341 is arranged in front of the front part frame 305*f* and at the rear of the front fork 313 when seen in side view. As a result, the speaker 341 is arranged below the head pipe 312, within the space having a triangular shape in side view with the vehicle body frame member and the front fork 313 serving as the two edges thereof, and therefore, it is possible to efficiently arrange the speaker 341 below the head pipe 312 and easily achieve protection of the speaker 341.

Reference symbol 341' in the figure denotes a speaker arranged on the front end part of the power unit 309, and reference symbol 341*a'* denotes a sound emission direction of this speaker 341'. At the front end part of the power unit 309, there is provided an extended cover 358*a* that integrally continues to the front side of the battery case 350 and the motor case 333, and within this extended cover 358*a*, there are housed the DC-DC converter 394, the control unit 398, and the speaker 341'.

The sound emission direction 341*a'* of the speaker 341' is oriented diagonally downward and forward, and sound emission is performed from the lower part opening of the extended cover 358*a*, which opens downward, toward the ground. As a result, it is possible to efficiently transmit a sound of the speaker 341' to the surrounding area while using ground sound reflection, and with the speaker 341' being distanced from the driver, the magnitude of the alert sound to be heard by the driver can be reduced.

Hereunder, there is described a frequency control of an alert sound of the speaker in each embodiment.

Figure 6:
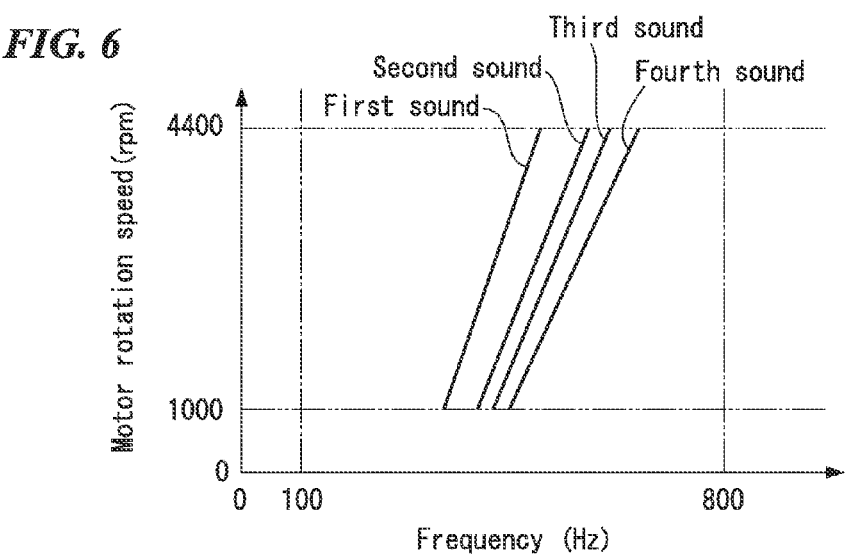
FIG. 6 is a graph showing the relationship between frequency of the alert sound and rotation speed of the electric motor in each embodiment.

FIG. 6 is a graph showing the relationship between the rotation speed rpm of the electric motor and the frequency Hz of the alert sound of the speaker in the case where the power transmission path from the electric motor to the rear wheel has a centrifugal clutch.

In each embodiment, the alert sound is output as a synthetic sound of four frequencies (including consonant sound and dissonant sound). To describe in detail, the alert sound has a first sound serving as a reference sound, a second sound having a frequency 1.18 times the reference sound, a third sound having a frequency 1.23 times the reference sound, and a fourth sound having a frequency 1.33 times the reference sound. The respective sounds are output at the following percentages. The first sound is output at 30% of the entire sound, the second sound is output at 25% of the entire sound, the third sound is output at 25% of the entire sound, and the fourth sound is output at 5% of the entire sound. The remaining 15% is a noise sound.

In FIG. 6, the slope of the first sound is 48 Hz/1,000 rpm, and has an intercept of 288 Hz at 1,000 rpm.

That is to say, the frequency of the first sound at 1,000 rpm can be obtained from the following formula (1).

$$1{,}000 \times 48/1{,}000 + 288 = 336 \text{ (Hz)} \tag{1}$$

At this time, the frequency of the second sound is 396 Hz, the frequency of the third sound is 413 Hz, and the frequency of the fourth sound is 447 Hz, and a synthetic sound that contains these respective sounds is output from the speaker 160. A synthetic sound is used as an alert sound in order to make the alert sound more audible to the surrounding area compared to a single sound at a specific frequency. An alert sound of a single sound may be output.

The alert sound is output when the rotation speed of the electric motor is in a range of 1,000 to 4,400 rpm. 1,000 rpm of the electric motor corresponds to the engagement rotation speed of the centrifugal clutch, that is, the take-off rotation speed, and 4,400 rpm corresponds to the rotation speed at which no alert sound is required.

The alert sound shifts to a higher frequency [in proportion to] with the increase of the motor rotation speed. This is done in order for the state of acceleration and deceleration of the vehicle to be comprehended.

Moreover, by making the increase rate of the alert sound frequency lower than the increase rate of the motor rotation speed, the fluctuation band of the alert sound frequency is suppressed, and even the highest frequency is lower than the specific frequency (800 Hz). As a result, it is possible to make the sound more audible to people of any age group, and the alert sound can be set to a favorable sound range. The lowest frequency of the alert sound is preferably higher than 100 Hz, taking the audibility into consideration.

That is to say, by setting the sound emission frequency of the speaker to a range between 100 HZ and 800 HZ, it is possible to emit the alert sound with use of an audible sound range.

Here, if the ratios of the frequencies of the second sound, the third sound, and fourth sound with respect to the frequency of the first sound (reference sound) are a2, a3, and a4, these ratios have a relationship shown with the following formula (2).

$$a2-1 > a3-a2 \tag{2}$$

It has been discovered that an alert sound can be made a favorable sound with fluctuations or undulations, by making the "a3−a2" less than or equal to 0.05.

Figure 7:
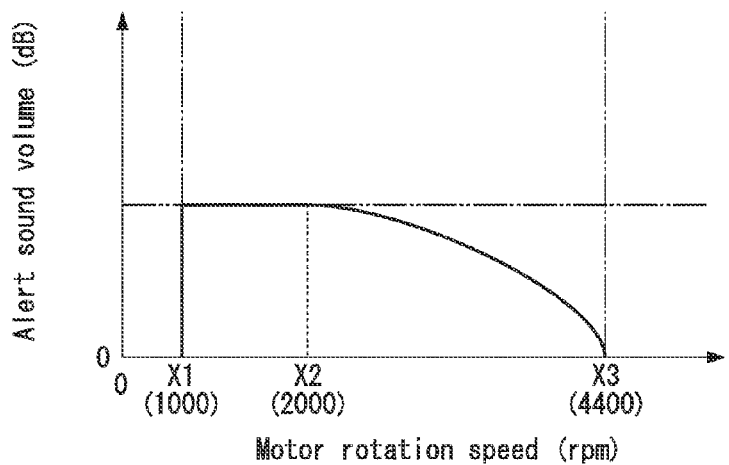
FIG. 7 is a graph showing the relationship between sound volume of the alert sound and rotation speed of the electric motor in each embodiment.

As shown in FIG. 7, the alert sound is set such that it is output at a constant sound volume from the vehicle take-off rotation speed X1 (1,000 rpm in the respective embodiments), however, the sound volume starts to decrease parabolically from the ease-off rotation speed X2 around the halfway (2,000 rpm in the respective embodiments), and the output stops at the sound stop rotation speed X3 (4,400 rpm in the respective embodiments).

Figure 8:
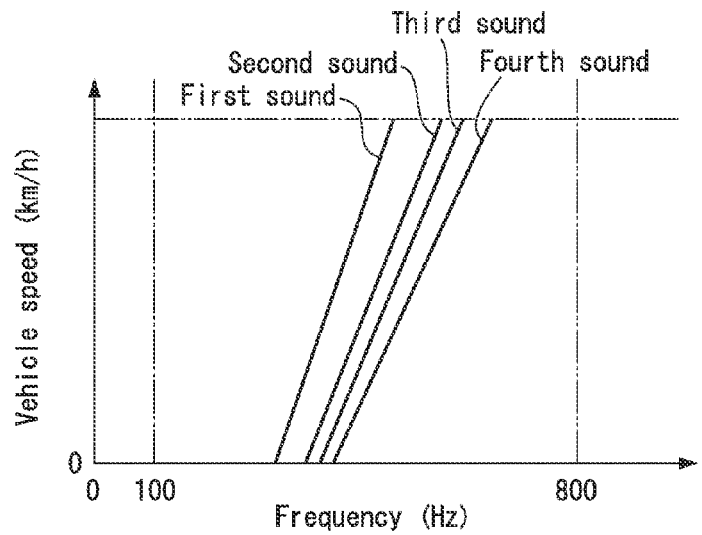
FIG. 8 is a graph as a modified example of control shown in FIG. 6, showing the relationship between frequency of the alert sound and vehicle speed.

As shown in FIG. 8, the frequency of the alert sound, instead of the rotation speed of the electric motor, may be controlled according to the changes in the vehicle speed. In this case, an alert sound may be emitted at the point in time where the rotation of the wheel from the stop state (vehicle speed 0 km/h) is detected for example.

Figure 9:
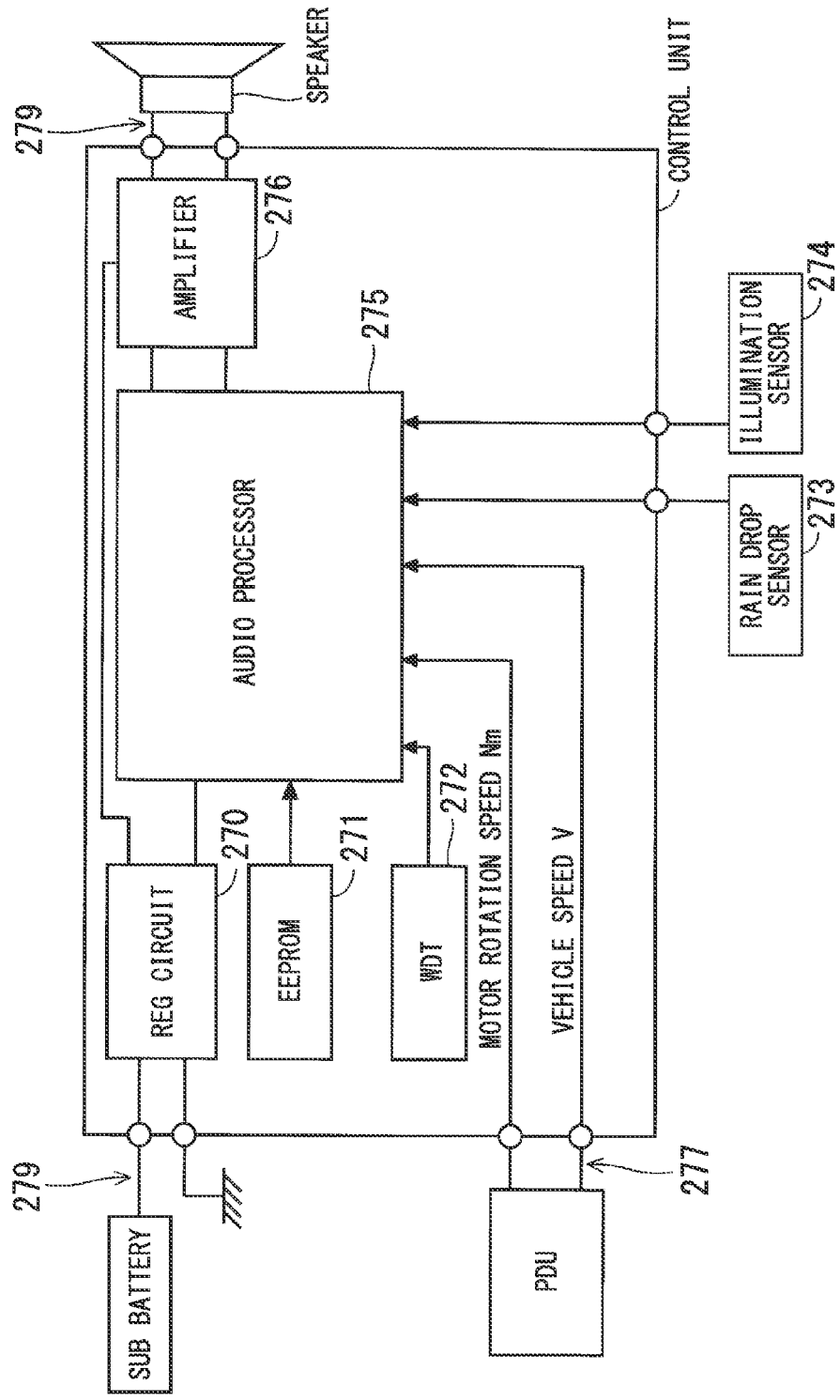
FIG. 9 is a block diagram showing a configuration of a speaker control unit in the electric motor.

FIG. 9 is a block diagram showing a configuration of the control unit for the speaker. The control unit includes an REG (regulator) circuit 270, an EEPROM 271 serving as a pseudo engine sound volume memory device that records a sound source and a sound volume of an engine sound of an internal combustion engine vehicle, a WDT (watch dog timer) 272 for maintaining the normal system operation, an audio processor 275, and an amplifier 276.

The control unit receives an input of information from the PDU (motor driver) via a first coupler 277. Moreover, to the REG circuit 270 of the control unit there is connected via a two-pin type second coupler 279, a sub battery that serves as a speaker power supply. Furthermore, to the amplifier 276 of the control unit there is connected via the second coupler 279, a speaker. The audio processor 275 receives inputs of output information from the EEPROM 271 and the WDT 272, and motor rotation speeds Nm and vehicle speeds V input from the PDU.

Based on the information of the motor rotation speed Nm and the vehicle speed V, the audio processor 275 calls a predetermined sound source from the EEPROM 271, and outputs an alert sound from the speaker at a predetermined sound volume via the amplifier 276.

In this figure, the input portion of the sub battery and the output portion from the amplifier 276 are illustrated as being separated, however, both of these portions are consolidated at a four-pin type second coupler 279. Moreover, output information of a rain drop sensor 273 and an illumination sensor 274 may be further input to the audio processor 275. In this case, for example, this may be handled by replacing the four-pin type second coupler 279 with a six-pin type coupler.

In the case where the climate is detected as being raining by the rain drop sensor 273, the audio processor 275 may increase the sound volume of the alert sound compared to that at normal times so that the recognition effect of the alert sound would not be reduced by the sound of falling rain. Moreover, when the time is detected as being night time by the illumination sensor 274, the alert sound volume may be set to be lower than that at normal times. Furthermore, by applying a noise sensor or the like, it is also possible to set the alert sound volume to be increased when, for example, the noise level of the surrounding area is high due to increased traffic.

Figure 10:
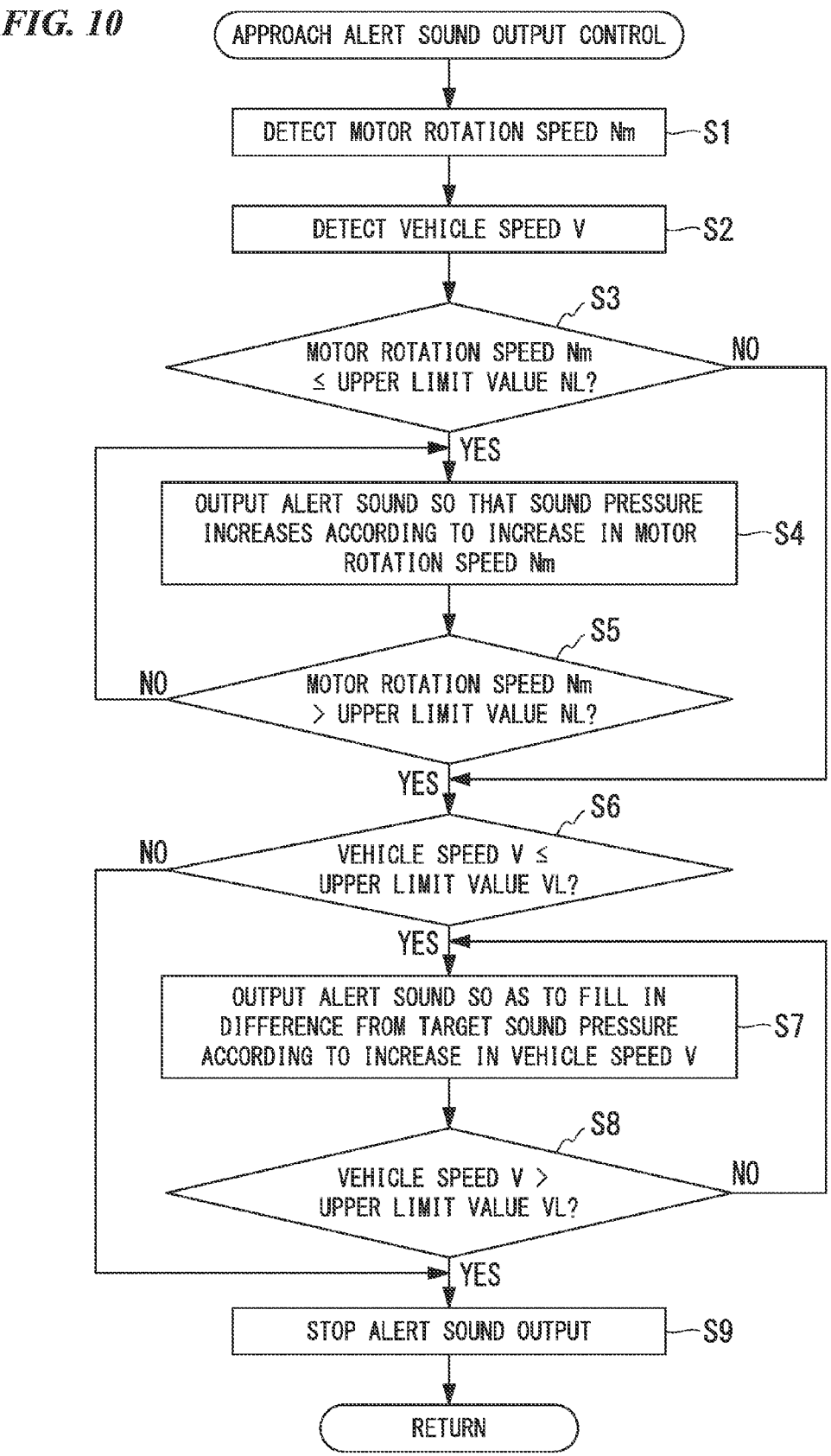
FIG. 10 is a flow chart showing steps of an alert sound output control.

FIG. 10 is a flow chart showing steps of an approach alert sound output control. In step S1, a motor rotation speed Nm is detected based on the information from the PDU, and in step S2, a vehicle speed V is detected based on the information from the PDU. In step S3, it is determined whether or not the motor rotation speed is less than or equal to an upper limit value NL. This upper limit value NL is set to the engagement rotation speed of the centrifugal clutch that is arranged on the output transmission path of the electric motor.

In step S4, an alert sound is output from the speaker, the sound volume of which increases according to the increase in the motor rotation speed Nm. In step S5, it is determined whether or not the motor rotation sped Nm has exceeded the upper limit value NL. If a positive determination is made the process proceeds to step S6, and if a negative determination is made the process returns to step S4. That is to say, while the non-traveling state is maintained until the centrifugal clutch is engaged, the alert sound is output so that the sound volume thereof increases according to the rotation speed of the electric motor.

In step S6, it is determined whether or not the vehicle speed V is less than or equal to an upper limit value VL. In the respective embodiments, this upper limit value VL is set to a vehicle speed of 20 km/h. If a positive determination is made in step S6, the process proceeds to step S7, and the alert sound is output so as to fill in the difference from the target sound volume according to the increase in the vehicle speed V. In the respective embodiments, the alert sound is output so as to fill in the sound volume difference between a two wheeled vehicle with an electric motor and a two wheeled vehicle with an internal combustion engine.

The alert sound volume at respective predetermined vehicle speeds may be preliminarily set as sound volume data by means of experiment or the like to suit each vehicle, and the set data may be stored in the EEPROM 271 of the control unit. In the respective embodiments, it is set to output a traveling sound equivalent to that of a Japanese class 1 motorcycle with a 50 cc engine that corresponds to the vehicle class of each vehicle. However, if the vehicle class of each vehicle corresponds to that of a Japanese ordinary motorcycle for example, a traveling sound equivalent to that of a Japanese ordinary motorcycle class vehicle with a 400 cc engine may be output. The relationship between the vehicle class of each vehicle and the alert sound volume may be arbitrarily set in accordance with vehicle classifications and license classifications set out in road traffic law.

In step S8, it is determined whether or not the vehicle speed V has exceeded the upper limit value VL, and if a positive determination is made, the process proceeds to step S9 to stop the output of the alert sound, and the sequence of control ends. If a negative determination is made in step S6, the process proceeds to step S9, and if a negative determination is made in step S8, the process returns to step S7.

According to the approach alert sound output control described above, it is possible to output an approach alert sound at a sound volume that accords with the traveling sound of an actual internal combustion engine vehicle, compared to the control method that simply increases the sound volume based on the increase in the motor rotation speed and the vehicle speed. Specifically, it is possible to perform a control in a manner such that a traveling sound equivalent to that of an internal combustion engine vehicle corresponding to the vehicle class or vehicle classification of each vehicle is output. Furthermore, the tone of the approach alert sound may be selected from various types of tones, in addition to recorded data from an internal combustion engine vehicle corresponding to the vehicle class or vehicle classification of each vehicle.

Moreover, the sound emitter is such that by raising the frequency of the alert sound [in proportion to] with the increase in the rotation speed of the electric motor, the state of acceleration and/or deceleration of the vehicle can be comprehended by pedestrians and other road users, and it is possible, in combination with the arrangement of the sound emitter, to obtain a high level of alerting effect even with a small sound emitter.

Furthermore, by setting the increase rate of the alert sound frequency to become lower than the increase rate of the electric motor rotation speed, it is possible to make the surroundings recognize acceleration of the vehicle while setting the alert sound at a favorable tone range that also has a high level of alerting effect.

In addition, with the sound emission frequency of the sound emitter being set within a range between 100 HZ and 800 HZ, it is possible, in combination with the arrangement of the sound emitter, to emit a sound that can be easily heard by and is favorable to people of any age group, using a small sound emitter.

<Fifth Embodiment>

Figure 11:
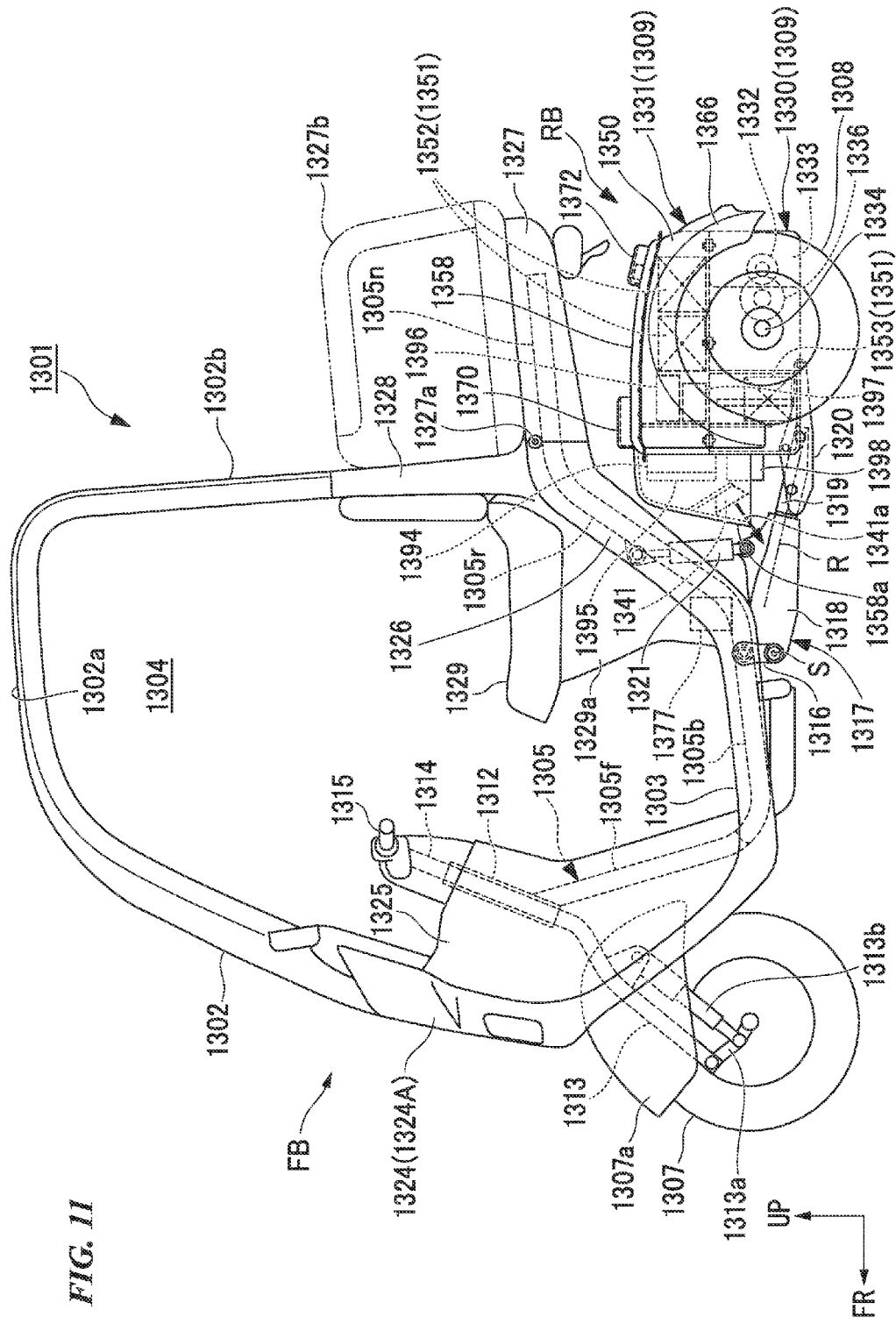
FIG. 11 is a left side view of a three wheeled vehicle to which a vehicle approach alert device for a saddle-ridden electric vehicle in a fifth embodiment of the present invention is applied.

A fifth embodiment of the present embodiment is described, with reference to FIG. 11. Descriptions of constituents the same as or similar to those in the above embodiments are appropriately simplified or omitted.

A three wheeled vehicle 1301 shown in FIG. 11 that serves as a saddle-ridden electric vehicle is provided with a roofed cabin 1304 that has a wind screen 1302 at the front part thereof, and a low floor 1303 at the bottom part thereof. The cabin 1304 is supported on a front vehicle body FB that is provided with a single front wheel (steering wheel) 1307, and this vehicle front body FB is left-right-swingably (rollably) connected to a rear vehicle body RB that is provided with a pair of left and right rear wheels (driving wheels) 1308. That is to say, the three wheeled vehicle 1301 is formed as a swing type vehicle in which the front and rear vehicle bodies FB and RB can swing relatively to each other.

Here, the three wheeled vehicle 1301 is provided with a vehicle approach alert device 1340 that notifies pedestrians or other road users of approach of the vehicle, by outputting a predetermined alert sound from a sound emitter installed on the vehicle.

In the present embodiment, a speaker 1341 that serves as a sound emitter for emitting an alert sound, is provided below a driver's seat part (upper surface of a seat 1329) and on the front end side (base end side) of a power unit 1309.

At the front end part of the power unit 1309, there is provided an extended cover (unit cover) 1358a that integrally continues to the front side of a battery case 1350 and a motor case 1333, and within this extended cover 1358a, there are housed a DC-DC converter 1394, a control unit 1398, and a speaker 1341.

The sound emission direction (sound emission direction, shown with arrow 1341a in the figure) of the speaker 1341 is oriented diagonally downward and forward, and sound emission is performed from the lower part opening of the extended cover 1358a, which opens downward, toward the ground. As a result, it is possible to efficiently transmit a sound of the speaker 1341 to the surrounding area while using ground sound reflection, and with the speaker 1341 being distanced from the driver, the magnitude of the alert sound to be heard by the driver can be reduced. Moreover, a swing joint 1317 is positioned below the speaker 1341, and it is also possible to suppress splash and the like from the road surface against the speaker 1341.

The sound volume of the speaker 1341 is controlled by the control unit 1398 according to the vehicle speed and so forth. There is no particular limitation to the number of speakers 1341 to be installed.

As has been described, the vehicle approach alert device 1340 for a saddle-ridden electric vehicle in the above embodiment is such that an alert sound for notifying the surrounding area of approach of the three wheeled vehicle 1301, is output to the surrounding area from the speaker 1341 attached on the vehicle body of the three wheeled vehicle 1301 that includes the electric motor 1332 in the power engine (power unit 1309). Further, there is provided the power unit 1309 that supports the electric motor 1332 and the driving wheels (rear wheels 1308) and that is vertically swingably connected to the vehicle body frame 1305, and the speaker 1341 is provided on the power unit 1309, below the driver's seat part (seat 1329).

According to this configuration, by arranging the speaker 1341 below the driver's seat part and on the power unit 1309, which is comparatively close to the ground, it is possible to reduce the magnitude of an alert sound to be heard by the driver due to the speaker 1341 being distanced therefrom, and transmit the alert sound efficiently to the surrounding area using ground sound reflection also.

Moreover, the vehicle approach alert device 1340 is provided with the extended cover 1358a that covers the front part of the power unit 1309, and the speaker 1341 is arranged within the extended cover 1358a.

According to this configuration, sound emission of the speaker 1341 can be diffused within the extended cover 1358a to efficiently transmit this sound to the surrounding area, and the speaker 1341 can be protected easily. Furthermore, it is also possible to further reduce the magnitude of an alert sound to be heard by the driver.

Moreover, the vehicle approach alert device 1340 is such that the sound emission direction 1341a of the speaker 1341 is oriented downward.

According to this configuration, an alert sound can be efficiently transmitted to the surrounding area using ground sound reflection, and it is possible to further reduce the magnitude of the alert sound to be heard by the driver.

Furthermore, the vehicle approach alert device 1340 is such that the three wheeled vehicle 1301 is of a swing type vehicle that swings the vehicle body frame 1305 to the left and right with respect to the power unit 1309 having the pair of left and right driving wheels (rear wheels 1308), and the speaker 1341 is arranged above the swing joint 1317 that connects the power unit 1309 and the vehicle body frame 1305.

According to this configuration, it is possible, with the comparatively strong swing joint 1317, to suppress mud splash made to the speaker 1341 from the road surface.

Moreover, the vehicle approach alert device 1340 is provided with the battery 1351 between the pair of left and right driving wheels (rear wheels 1308), and the speaker 1341 is arranged in front of the battery 1351.

According to this configuration, the mass of the power unit 1309 can be concentrated, and the wiring arrangement can be established easily when connecting the battery 1351 to the electric motor 1332. Moreover, by arranging the speaker 1341 in front of the battery 1332, the sound reflection effect of the battery 1351 with mass can give an alert sound a forward directionality, while efficiently diffusing the alert sound within the power unit 1309.

<Sixth Embodiment>

Figure 12:
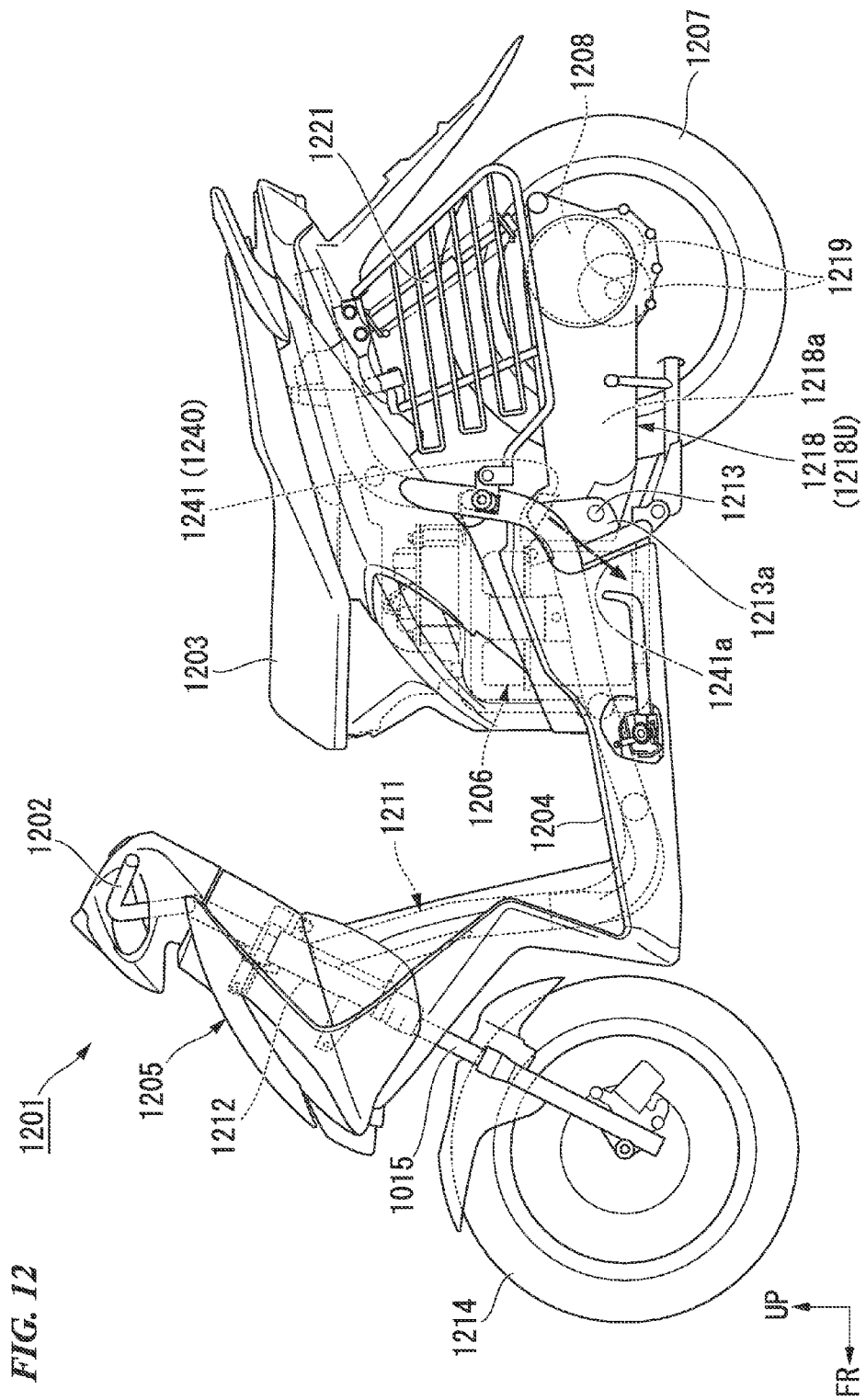
FIG. 12 is a left side view of a two wheeled vehicle to which a vehicle approach alert device for a saddle-ridden electric vehicle in a sixth embodiment of the present invention is applied.

Next, a sixth embodiment of the present invention is described, with reference to FIG. 12. Descriptions of constituents the same as or similar to those in the above embodiments are appropriately simplified or omitted.

A two wheeled vehicle 1201 shown in FIG. 12 that serves as a saddle-ridden electric vehicle is a scooter type vehicle provided with: a step floor 1204 that is provided between the steering handle bar 1202 and a seat 1203 for a passenger to sit thereon and that serves as a low floor part for passenger's feet to be placed thereon; and a vehicle cover 1205 that covers substantially the entire vehicle body, and has a single front wheel 1214 serving as a steering wheel and a single rear wheel 1207 serving as a driving wheel. Arrow FR in the figure denotes the front side of the vehicle and the arrow UP denotes the upper side of the vehicle.

At a rear position on the step floor 1204, there is mounted a battery unit 1206, and electric power of this battery unit 1206 is supplied to an electric motor 1208 on the left side of the rear wheel 1207 to drive this electric motor 1208. Further, with this driving force, the rear wheel 1207 is driven to allow the two wheeled vehicle 1201 to travel.

A vehicle body frame 1211 of the two wheeled vehicle 1201 is formed by integrally joining several types of steel materials by means of welding or the like. On the front end part of the vehicle body frame 1211 there is provided a head pipe 1212 that steerably supports a front wheel suspension system. On the lower part rear side of the vehicle body frame body 1211 there is provided a pivot bracket 1213a that vertically swingably supports a rear wheel suspension system.

The rear wheel suspension system is provided with a swing arm 1218 that axially supports the rear wheel 1207 on the rear end part thereof. The swing arm 1218 forms a swing unit (power engine, driving unit) 1218U that includes the electric motor 1208 and a gear mechanism (deceleration mechanism) 1219 built into the rear end part of the left arm thereof.

The front end part of the swing unit 1218U is vertically swingably supported on the pivot bracket 1213a of the vehicle body frame 1211 via a pivot shaft 1213. The rear end part of the swing unit 1218U is elastically supported on the upper part rear side of the vehicle body frame 1211 via a cushion unit 1221. The outer side of the swing unit 1218U is covered by a unit cover 1218a.

Here, the two wheeled vehicle 1201 is provided with a vehicle approach alert device 1240 that notifies pedestrians or other road users of approach of the vehicle, by outputting a predetermined alert sound from a sound emitter installed on the vehicle.

In the present embodiment, a speaker 1241 that serves as a sound emitter for emitting an alert sound is provided below a driver' seat part (upper surface of a seat 1203) and on the front end side (base end side) of the swing unit 1218U, and it is housed within the front part of the unit cover 1218a.

The sound emission direction of the speaker 1241 (sound emission direction, shown with arrow 1241a in the figure) is oriented diagonally downward and forward, and sound emission is made toward the ground through the spacing between the swing unit 1218U, the vehicle body frame 1211, and the battery unit 1206. The front end part of the swing unit 1218U is positioned below the speaker 1241, and it is also possible to suppress splash and the like from the road surface against the speaker 1241.

As has been described above, also in the vehicle approach alert device 1240 for a saddle-ridden electric vehicle in the above embodiment, by arranging the speaker 1241 below the driver's seat part and on the swing unit 1218U, which is comparatively close to the ground, it is possible to reduce the magnitude of an alert sound to be heard by the driver due to the speaker 1241 being distanced therefrom, and transmit the alert sound efficiently to the surrounding area using ground sound reflection also.

Moreover, sound emission of the speaker 1241 can be diffused within the unit cover 1218a to efficiently transmit this sound to the surrounding area, and the speaker 1241 can be protected easily.

Furthermore, an alert sound can be efficiently transmitted to the surrounding area using ground sound reflection, and it is possible to further reduce the magnitude of the alert sound to be heard by the driver.

<Seventh Embodiment>

Figure 13:
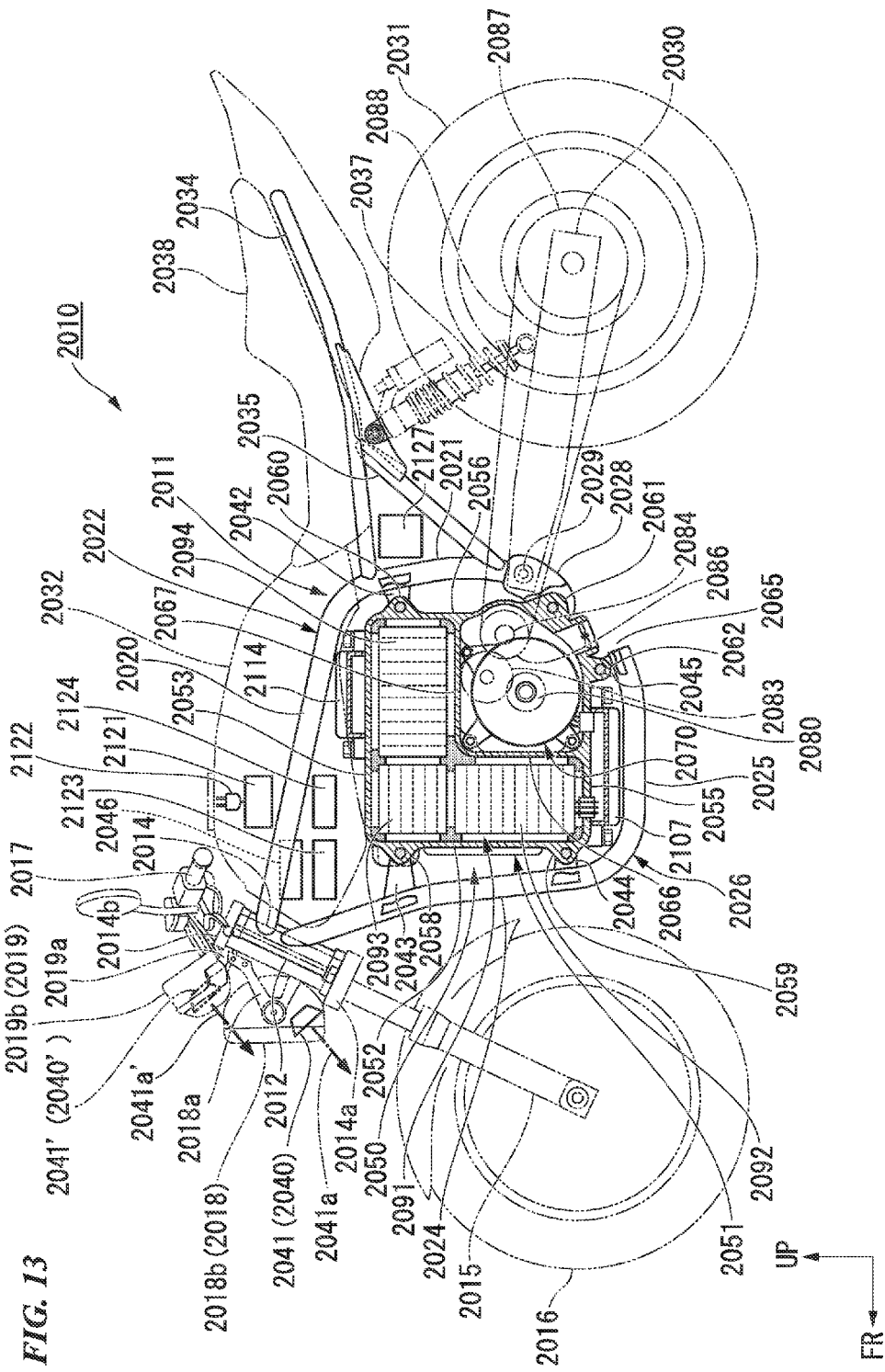
FIG. 13 is a left side view of a two wheeled vehicle to which a vehicle approach alert device for a saddle-ridden electric vehicle in a seventh embodiment of the present invention is applied.

A seventh embodiment of the present embodiment is described, with reference to FIG. 13. Descriptions of constituents the same as or similar to those in the above embodiments are appropriately simplified or omitted.

A two wheeled vehicle 2010 shown in FIG. 13 that serves as a saddle-ridden electric vehicle is such that: at the center part of the vehicle body thereof, there are mounted a main battery 2091 for traveling and a power unit assembly (power engine) 2050; the power unit assembly 2050 is driven with electric power supplied from the main battery 2091; and the driving force is transmitted to the a rear wheel 2031, which is a driving wheel, for traveling. Arrow FR in the figure denotes the front side of the vehicle and the arrow UP denotes the upper side of the vehicle.

Into a head pipe 2012 at the front end of the vehicle body frame 2011, there is rotatably inserted a steering stem 2014. At the lower end of the steering stem 2014, there is fixed a bottom bridge 2014a, and at the upper end, there is fixed a top bridge 2014b. On both of the left and right sides of the respective bridges 2014a and 2014b, there are attached the upper part of a front fork 2015 with a pair of left and right portions. On the lower end part of the left and right portions of the front fork 2015, there is axially supported a front wheel 2016. At the upper part of the top bridge 2014b, there is attached a steering handle bar 2017.

In front of the head pipe 2012, there is arranged a single-lamp type circular head lamp (electrical component) 2018, and this head lamp 2018 is supported on the respective bridges 2014a and 2014b via a lamp stay 2018a that joins these bridges. Moreover, above the head lamp 2018, there is arranged a meter unit (electrical component) 2019, and this meter unit 2019 is supported on the top bridge 2014b via a meter stay 2019a.

The vehicle body frame 2011 has: a single main frame 2022 that includes an upper frame part 2020 extending backward from the head pipe 2012 and a back frame part 2021 extending downward from the rear end of this upper frame part 2020, and that is arranged at the vehicle widthwise center; a single down tube 2026 that includes a front frame part 2024 extending downward from the lower side of the main frame 2022 of the head pipe 2012, and a lower frame part 2025 extending backward from the lower end of this front frame part 2024, and that is arranged at the vehicle body widthwise center; and a pivot bracket 2028 that is fixed at the lower end of the back frame part 2021 of the main frame 2022.

On the pivot bracket 2028, via a pivot shaft 2029, there is axially supported the front end part of a swing arm 2030, and at the rear end part of the swing arm 2030, there is axially supported the rear wheel 2031. Between the left and right arms of the swing arm 2030 and a pair of left and right seat frames 2034 that extend backward from the main frame 2022, there are respectively intervened a pair of left and right rear cushions 2037. The left and right seat frames 2034 are supported from the lower side, on a pair of left and right rear sub frames 2035 that extend backward and upward from the lower part of the back frame part 2021. On each seat frame 2034 there is supported a seat 2038 for the driver to sit thereon. In front of the seat 2038 there is provided a tank type cover 2032 so as to cover the upper frame part 2020 of the main frame 2022.

The back frame part 2021 of the main frame 2022 has, on the upper part thereof, a pair of left and right attachment plates 2042. Moreover, the front frame part 2024 of the down tube 2026 has a pair of left and right attachment plates 2043 at the vertically intermediate part thereof, and a pair of left and right attachment plates 2044 at the lower part thereof. In addition, the lower frame part 2025 of the down tube 2026 has a pair of left and right attachment plates 2045 at the rear end part thereof.

The power unit assembly 2050 is arranged, in a form of being supported by the respective attachment plates 2042 to 2045 and the pivot bracket 2028, in a portion that is surrounded by the main frame 2022 and the down tube 2026.

The power unit assembly 2050 has a substantially rectangular solid-shaped case 2051 that forms the exterior thereof. At the top and bottom of the front surface of a front plate part 2052 of the case 2051 there are respectively formed attachment seat parts 2058 and 2059, at the top and bottom of the rear surface of a rear plate part 2056 of the case 2051 there are respectively formed attachment seat parts 2060 and 2061, and at the rear part of the lower surface of a lower plate part 2055 of the case 2051 there is formed an attachment seat part 2062.

The attachment seat parts 2058 and 2059 are respectively fitted to the attachment plates 2043 and 2044 of the vehicle body frame 2011 by means of bolt fastening or the like, the attachment seat parts 2060 and 2061 are respectively fitted to the attachment plate 2042 of the vehicle body frame 2011 and the pivot bracket 2028 by means of bolt fastening or the like, and the attachment seat part 2062 is fitted to the attachment plate 2045 by means of bolt fastening or the like. As a result, the power unit assembly 2050 is stationarily supported on the vehicle body frame 2011.

The power unit assembly 2050 becomes a link for a discontinuous part 2065 of the vehicle body frame 2011, between the pivot bracket 2028 and the lower frame part 2025 which are apart from each other, and this power unit assembly 2050 serves also as part of the vehicle body frame 2011. That is to say, the vehicle body frame 2011 has the single main frame 2022, and is of a monocoque back diamond frame in which the power unit assembly 2050 becomes a link for the discontinuous part 2065 between the pivot bracket 2028 and the down tube 2026 that are fixed on the main frame 2022.

The case 2051 has the rear end part lower side of the inner space thereof separated by a bulkhead (vertical plate part 2066 and horizontal plate part 2067), as a housing part for an electric motor 2070. The side view L-shaped portion of the inner space of the case 2051 along the front plate part 2052 and an upper plate part 2053, serves as a housing part for the main battery 2091.

The electric motor 2070 is arranged with the rotation shaft 2080 thereof along the left-right direction, and it rotates a counter shaft 2084 via a reduction gear 2083. On the left end part of the counter shaft 2084 that projects to the outside of the case 2051, there is supported a front sprocket 2086, and a chain 2088 is wound on this front sprocket 2086 and a rear sprocket 2087 on the left side of the rear wheel 2031, to thereby form a power transmission mechanism. Further, the driving force of the power unit assembly 2050 is transmitted to the rear wheel 2031 via this power transmission mechanism.

The main battery 2091 is formed with three rectangular solid-shaped battery modules 2092, 2093, and 2094. The battery module 2092 is arranged between the lower part of the front plate part 2052 and the vertical plate part 2066 (in front of the electric motor 2070), the battery module 2093 is arranged above this battery module 2092 and at the rear of the upper part of the upper plate part 2053 (diagonally forward and upward of the electric motor 2070), and the battery module 2094 is arranged at the rear of this battery module 2093 and between the rear part of the upper plate part 2053 and the horizontal plate part 2067 (above the electric motor 2070).

Within the case 2051, there is appropriately formed an air passage for cooling the electric motor 2070 and the main battery 2091. On the lower surface of the lower plate part 2055 of the case 2051, there is attached a motor driver (PDU: power driver unit) 2107, and on the upper surface of the upper plate part 2053 of the case 2051, there is attached a DC-DC converter 2114.

Within the tank type cover 2032, there are arranged a recharger 2121, a plug cord 2122 for electrically connecting this recharger 2121 to an external power supply such as a commercial power supply, a motor control unit (MCU: motor control unit) 2123, which is a high voltage electrical component, and a battery managing unit (BMU: battery managing unit) 2124, which is a high voltage electrical component. Moreover, a 12V sub battery 2127 is arranged within the space surrounded by the back frame part 2021 of the main frame 2022, the seat frame 2034, and the rear sub frame 2035, when seen in side view.

Electric power of the main battery 2091 is supplied to the motor driver 2107 via a contactor that operates in synchronization with a main switch (neither shown in the figure), and it is converted from direct current into three-phase alternating current at the motor driver 2107, and is then supplied to the electric motor 2070, which is a three-phase alternating current motor. Moreover, the voltage of the main battery 2091 is lowered via the DC-DC converter 2114, and it is supplied to the 12V sub battery 2127 and general electrical components such as a lamp, and also to control system components such as the motor control unit 2123.

The main battery 2091 is recharged by the recharger 2121 connected to an AC100V power supply for example. The recharging/discharging status and the temperature of the main battery 2091 are monitored by the battery managing unit 2124, and this information is shared with the motor control unit 2123. The motor control unit 2123 receives inputs of output request information from a throttle (accelerator) sensor, and based on this output request information, the motor control unit 2123 performs control to drive the electric motor 2070 via the motor driver 2107.

Here, the two wheeled vehicle is provided with a vehicle approach alert device 2040 that notifies pedestrians or other road users of approach of the vehicle, by outputting a predetermined alert sound from a sound emitter installed on the vehicle.

In the present embodiment, a speaker 2041 that serves as a sound emitter for emitting an alert sound is arranged in front of the head pipe 2012 and below the head lamp 2018, and is housed within a lamp case 2018b of this head lamp 2018.

The sound emission direction (sound emission direction, shown with arrow 2041a in the figure) of the speaker 2041 is oriented diagonally downward and forward, and sound emission is performed toward the ground from an opening or the like formed at the lower end of the lamp case 2018b.

At the rear of the head pipe 2012 and within the front part of the tank type cover 2032, there is arranged a control unit 2046 for output control of the speaker 2041. The sound volume of the speaker 2041 is controlled by this control unit 2046 according to the vehicle speed and so forth. By arranging the control unit 2046 and the speaker 2041 in close proximity to each other, installation of wiring between them becomes easy.

Reference symbol 2041' in the figure denotes a speaker that is arranged in front of the head pipe 2012 and on the front side of the lower part of the meter unit 2019, and reference symbol 2041a' denotes a sound emission direction of the speaker 2041'. The speaker 2041' is housed within a meter case 2019b. The sound emission direction 2041' of the speaker 2041' is oriented diagonally downward and forward, and sound emission is performed toward the ground from an opening or the like formed in the front side of the lower part of the meter case 2019b.

As has been described, the vehicle approach alert device 2040 for a saddle-ridden electric vehicle in the above embodiment is such that: the speaker 2041 (or the speaker 2041') that is attached on the vehicle body of the two wheeled vehicle 2010 having the electric motor 2070 included in the power engine (power unit assembly 2050) outputs an alert sound to the surrounding area for notifying the surrounding area of approach of the two wheeled vehicle 2010; the speaker 2041 (or the speaker 2041') is arranged on the inner side of the electric component (the head lamp 2018 or the meter unit 2019) that is exposed to the exterior of the vehicle; and the sound emission direction of the speaker 2041 (or the speaker 2041') is oriented downward.

According to this configuration, by installing the speaker 2041 (or the speaker 2041') within the electrical component that is exposed to the exterior of the vehicle, it is possible to efficiently transmit an alert sound to the surrounding area, and protection of the speaker 2041 (or the speaker 2041') becomes easy. Moreover, with the sound emission direction of the speaker 2041 (or the speaker 2041') being oriented downward, an alert sound can be efficiently transmitted to the surrounding area using ground sound reflection, and it is possible to further reduce the magnitude of the alert sound to be heard by the driver.

Furthermore, the vehicle approach alert device 2040 is such that with the electrical component being arranged in front of the head pipe 2012 of the vehicle body frame 2011, it is possible to efficiently transmit an alert sound to the front side of the vehicle and reduce the magnitude of the alert sound to be heard by the driver.

Moreover, in the vehicle approach alert device 2040, if the electrical component is a head lamp 2018 or a meter unit 2019 that is arranged at the front end of the vehicle body, sound is likely to be transmitted to the front side of the vehicle body, and the magnitude of the sound to be heard by the driver can be reduced. Furthermore, the structure of the speaker 2041 (or the speaker 2041') can be simplified using a waterproofing structure or the like for the electrical component.

<Eighth Embodiment>

Figure 14:
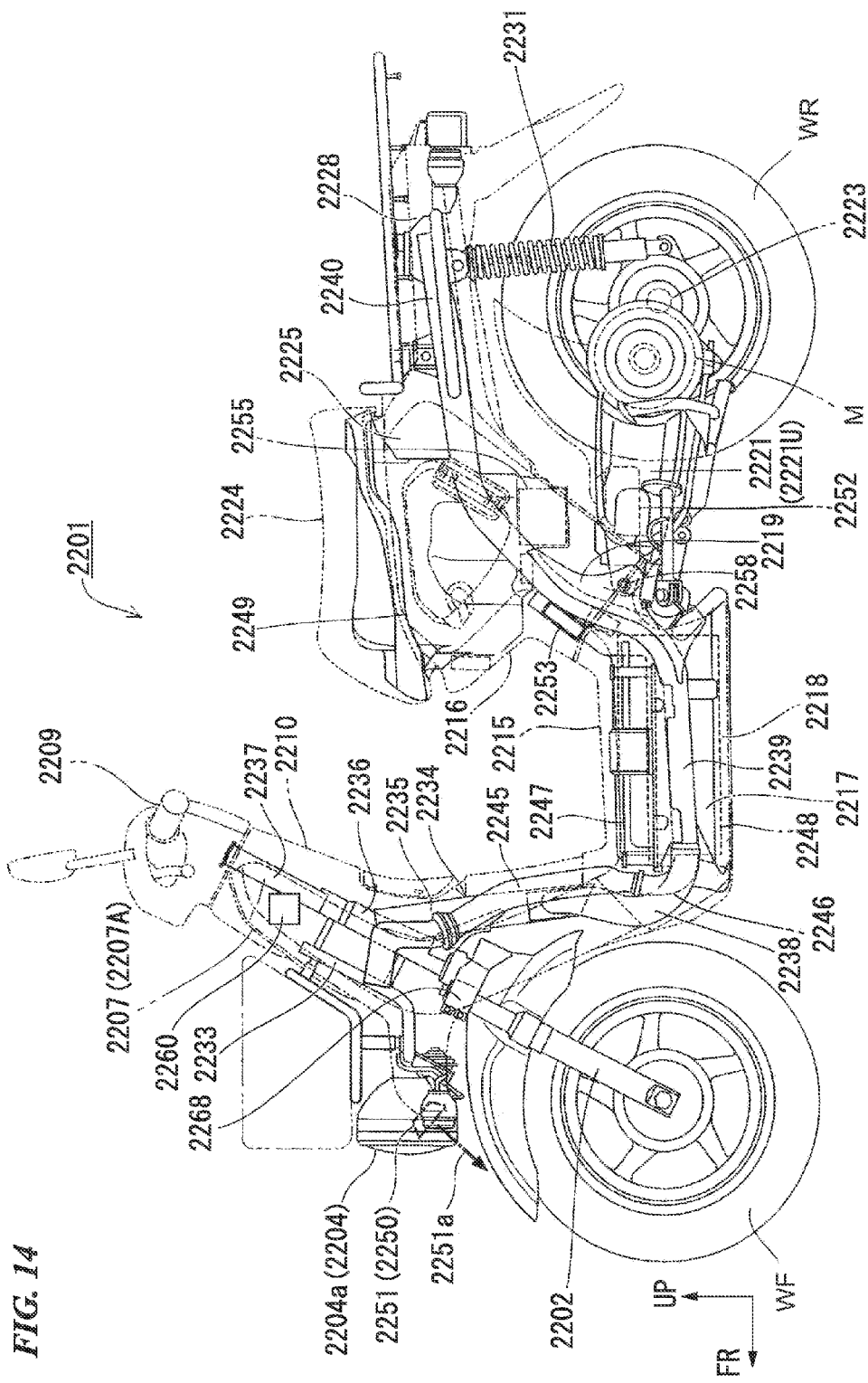
FIG. 14 is a left side view of a two wheeled vehicle to which a vehicle approach alert device for a saddle-ridden electric vehicle in an eighth embodiment of the present invention is applied.

Next, an eighth embodiment of the present invention is described, with reference to FIG. 14. Descriptions of constituents the same as or similar to those in the above embodiments are appropriately simplified or omitted.

A two wheeled vehicle 2201 shown in FIG. 14 that serves as a saddle-ridden electric vehicle is a scooter type vehicle having a low floor 2215 that travels in a manner such that a rear wheel WR axially supported on an axle 2223 is driven to rotate with rotation power exerted by an electric motor M that is built into a swing arm 2221. Arrow FR in the figure denotes the front side of the vehicle and the arrow UP denotes the upper side of the vehicle.

In the present embodiment, the swing arm 2221 forms, together with the electric motor M, a swing unit 2221U serving as a power engine of the two wheeled vehicle 2201.

Below a seat 2224 there is arranged a goods storage box 2249 that can be opened and closed by this seat 2224, and at the bottom part of this goods storage box 2249 there is arranged a 12V low voltage battery 2255.

At the front end of a front cover 2207A there is arranged a front stay 2233 fixed on the head pipe 2236, and a head lamp (electrical component) 2204 is supported on this front stay 2233.

Here, the two wheeled vehicle 2201 is provided with a vehicle approach alert device 2250 that notifies pedestrians or other road users of approach of the vehicle, by outputting a predetermined alert sound from a sound emitter installed on the vehicle.

In the present embodiment, a speaker 2251 that serves as a sound emitter for emitting an alert sound is arranged in front of the head pipe 2236 and below the head lamp 2204, and is housed within a lamp case 2204a of this head lamp 2204.

The sound emission direction (sound emission direction, shown with arrow 2251a in the figure) of the speaker 2251 is oriented diagonally downward and forward, and sound emission is performed toward the ground from an opening or the like formed at the lower end of the lamp case 2204a.

Above the head pipe 2236 and on the inner side of the front cover 2207A, there is arranged a control unit 2260 for output control of the speaker 2251. The sound volume of the speaker 2251 is controlled by this control unit 2260 according to the vehicle speed and so forth. By arranging both of the control unit 2260 and the speaker 2251 at the vehicle body front part, installation of wiring between them becomes comparatively easy.

As has been described above, also in the vehicle approach alert device 2250 for a saddle-ridden electric vehicle in the above embodiment, by installing the speaker 2251 within the electrical component (head lamp 2204) that is exposed to the exterior of the vehicle, it is possible to efficiently transmit an alert sound to the surrounding area and easily protect the speaker 2251, and also, the structure of the speaker 2251 can be simplified using a waterproofing structure or the like for the electrical component.

Moreover, with the sound emission direction 2251a of the speaker 2251 being oriented downward, an alert sound can be efficiently transmitted to the surrounding area using ground sound reflection, and it is possible to further reduce the magnitude of the alert sound to be heard by the driver.

Furthermore, with the electrical component being arranged in front of the head pipe 2236 of the vehicle body frame 2234, it is possible to efficiently transmit an alert sound to the front side of the vehicle and reduce the magnitude of the alert sound to be heard by the driver.

<Ninth Embodiment>

Figure 15:
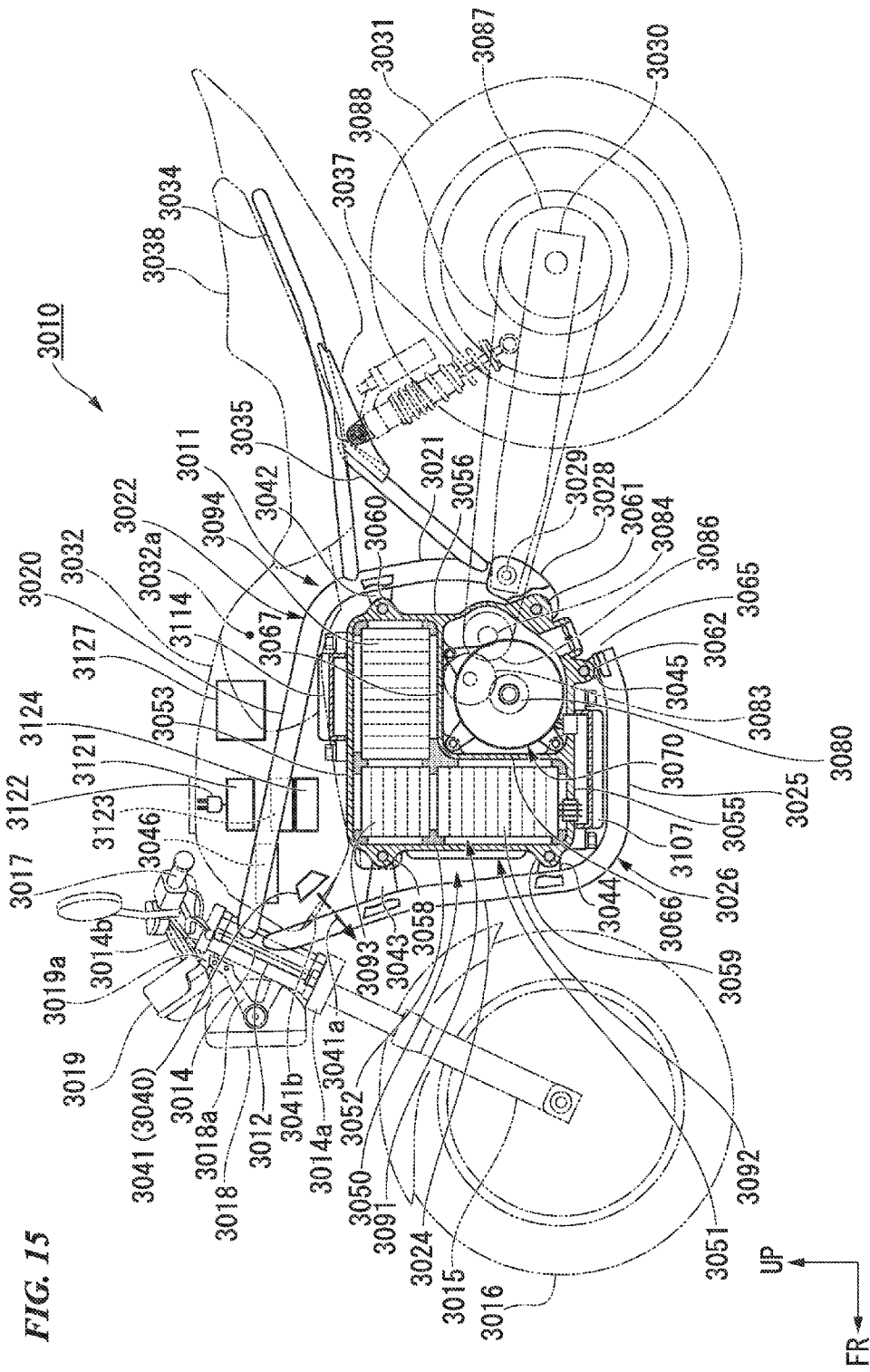
FIG. 15 is a left side view of a two wheeled vehicle to which a vehicle approach alert device for a saddle-ridden electric vehicle in a ninth embodiment of the present invention is applied.

A ninth embodiment of the present embodiment is described, with reference to FIG. 15. Descriptions of constituents the same as or similar to those in the above embodiments are appropriately simplified or omitted.

A two wheeled vehicle 3010 shown in FIG. 15 that serves as a saddle-ridden electric vehicle is such that: at the center part of the vehicle body thereof, there are mounted a main battery 3091 for traveling and a power unit assembly (power engine) 3050; the power unit assembly 3050 is driven with electric power supplied from the main battery 3091; and the driving force is transmitted to the a rear wheel 3031, which is a driving wheel, for traveling. Arrow FR in the figure denotes the front side of the vehicle and the arrow UP denotes the upper side of the vehicle.

In the present embodiment, the rear part of a tank type cover 3032 serves as a knee grip part 3032a that is to be sandwiched between both knees of a passenger (driver) sitting on a seat 3038.

Here, the two wheeled vehicle 3010 is provided with a vehicle approach alert device 3040 that notifies pedestrians or other road users of approach of the vehicle, by outputting a predetermined alert sound from a sound emitter installed on the vehicle.

In the present embodiment, a speaker 3041 that serves as a sound emitter for emitting an alert sound is arranged at the rear of a head pipe 3012 and diagonally upward and forward of a power unit assembly 3050, and also between the front part of an upper frame part 3020 and the upper part of a front frame part 3024 when seen in side view, and it is housed in the lower side of the front end part of the tank type cover 3032.

The sound emission direction (sound emission direction, shown with arrow 3041a in the figure) of the speaker 3041 is oriented diagonally downward and forward, and sound emission is performed toward the ground from an opening part 3041b formed in the lower side of the front end part of the tank type cover 3032.

Within the front end part of the tank type cover 3032 and above the speaker 3041, there is arranged and housed a control unit (output control device) 3046 for output control of the speaker 3041. The sound volume of the speaker 3041 is controlled by this control unit 3046 according to the vehicle speed and so forth.

Within the tank type cover 3032 there is arranged and housed a sub battery 3127, and this sub battery 3127 supplies electric power to the speaker 3041 and the control unit 3046.

With the speaker 3041, the control unit 3046, the sub battery 3127, and the motor control unit 3123 being collectively arranged within the tank type cover 3032, installation of wiring between the respective devices becomes easy.

As has been described above, the vehicle approach alert device 3040 for a saddle-ridden electric vehicle in the above embodiment, is such that the speaker 3041 that is attached on the vehicle body of the two wheeled vehicle 3010 having the electric motor 3070 included in the power engine (power unit assembly 3050) outputs an alert sound to the surrounding area for notifying the surrounding area of approach of the two wheeled vehicle 3010. At the rear of the head pipe 3012 of the vehicle body 3011, the two wheeled vehicle 3010 is provided with an exterior member (tank type cover 3032) that has the knee grip part 3032a to be sandwiched by both knees of the driver, and the speaker 3041 is arranged within the exterior member while the sound emission direction 3041a thereof is oriented diagonally downward and forward.

According to this configuration, with the speaker 3041 being arranged within the exterior member, which is comparatively large, it is possible to make use of the hollow within the exterior member to thereby achieve superior sound transmission to the surrounding area, and suppress sound transmission to the upper side (driver side) of the exterior member to thereby reduce the magnitude of sound to be heard by the driver. Moreover, with the speaker 3041 emitting sound diagonally downward and forward, it is possible to transmit sound efficiently to the surrounding area, using ground sound reflection. Furthermore, it is possible, with the exterior member, to protect the speaker 3041 easily.

Moreover, the vehicle approach alert device 3040 is such that with the exterior member having the opening part 3041b toward the sound emission direction 3041a of the speaker 3041, the sound of the speaker 3041 can be easily emitted to the outside of the cover (diagonally downward and forward), and sound can be transmitted efficiently to the surrounding area using ground sound reflection, while reducing the magnitude of an alert sound to be heard by the driver.

Furthermore, the vehicle approach alert device 3040 is such that with the speaker 3041 being arranged within the front end part of the exterior member, it is possible to have the speaker 3041 distanced from the driver, and the magnitude of the alert sound to be heard by the driver can be reduced.

Moreover, the vehicle approach alert device 3040 is such that with the driving control device (motor control unit 3123) for the power engine and the output control device (control unit 3046) for the speaker 3041 being arranged within the exterior member, the speaker 3041, the control unit 3046, and the motor control unit 3123 are arranged in close proximity to each other. As a result, installation of wiring between them can be done easily and the respective control devices can be easily protected.

Furthermore, the vehicle approach alert device 3040 is such that with the sub battery 3127 that serves as a power supply of the speaker 3041 being arranged within the exterior member, the speaker 3041 and the sub battery 3127 serving as the power supply thereof are arranged in close proximity to each other. As a result, installation of wiring between them can be done easily.

<Tenth Embodiment>

Figure 16:
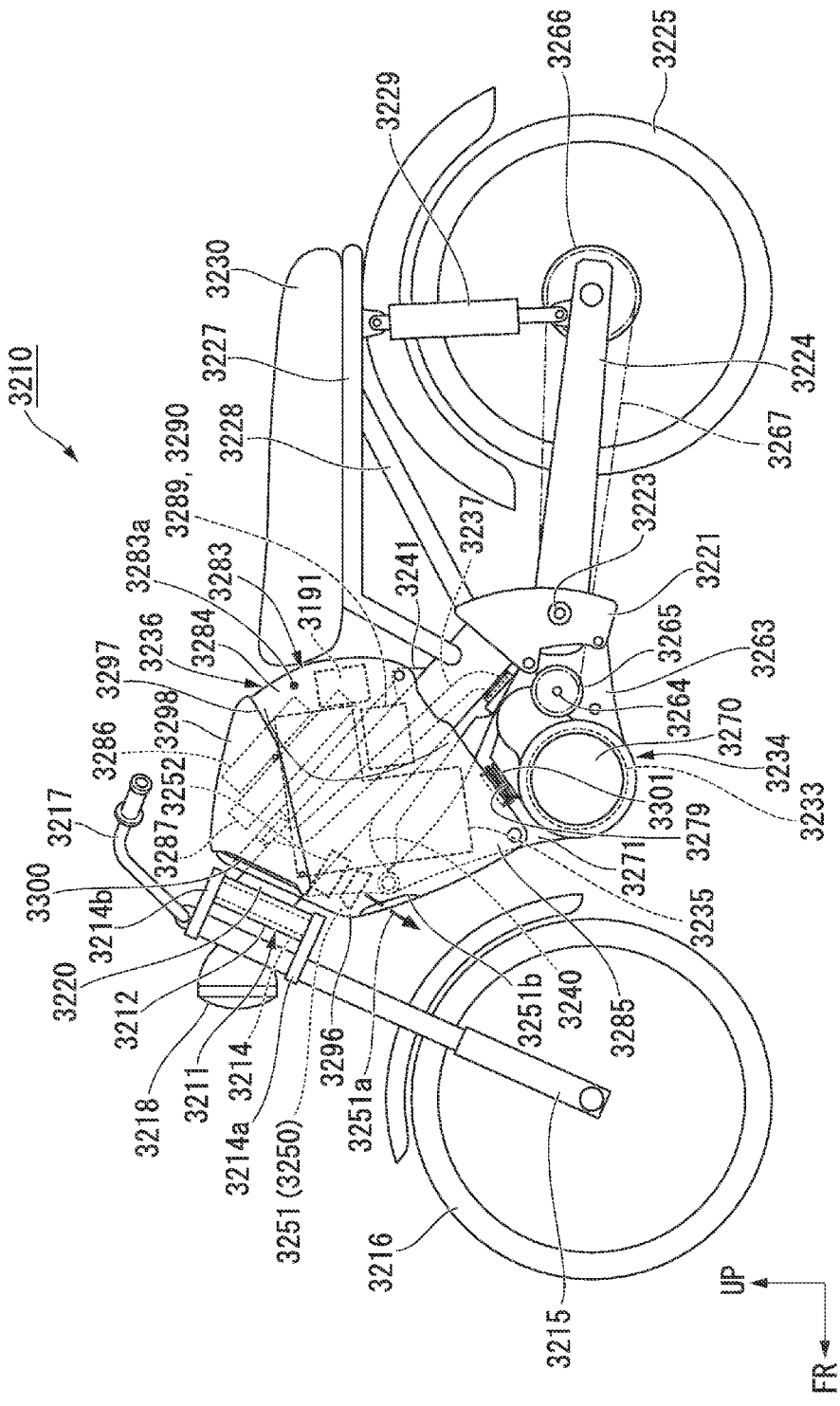
FIG. 16 is a left side view of a two wheeled vehicle to which a vehicle approach alert device for a saddle-ridden electric vehicle in a tenth embodiment of the present invention is applied.

Next, a tenth embodiment of the present invention is described, with reference to FIG. 16. Descriptions of constituents the same as or similar to those in the above embodiments are appropriately simplified or omitted.

A two wheeled vehicle 3210 shown in FIG. 16 that serves as a saddle-ridden electric vehicle is such that: below a main frame 3220 of a vehicle body frame 3211 there is arranged a power unit (power engine) 3234 having an electric motor 3233 for generating traveling driving force provided therein; on the upper side and on both left and right sides of the main frame 3220 there is arranged a battery unit 3236 having a battery 3235 for supplying electric power to the electric motor 3233 provided therein; and the driving force of the electric motor 3233 is transmitted to a rear wheel 3225, which is a driving wheel, for traveling. Arrow FR in the figure denotes the front side of the vehicle and the arrow UP denotes the upper side of the vehicle.

Into a head pipe 3212 at the front end of the vehicle body frame 3211 there is rotatably inserted a steering stem 3214. At the lower end of the steering stem 3214 there is fixed a bottom bridge 3214a, and at the upper end there is fixed a top bridge 3214b. On both of the left and right sides of the respective bridges 3214a and 3214b there are attached the upper part of a front fork 3215 with a pair of left and right portions. On the lower end part of the left and right portions of the front fork 3215 there is axially supported a front wheel 3216. At the upper part of the top bridge 3214b there is attached a steering handle bar 3217. In front of the head pipe 3212 there is arranged a single-lamp type circular head lamp 3218.

At the lower rear end of the main frame 3220 that extends diagonally backward and downward from the head pipe 3212, there is fixed a pivot bracket 3221, and on this pivot bracket 3221 there is vertically swingably supported the front end part of the swing arm 3224 via a pivot shaft 3223. At the rear end part of the swing arm 3224 there is axially supported a rear wheel 3225. Between the left and right arms of the swing arm 3224 and a pair of left and right seat frames 3227 that extend backward from the main frame 3220, there are respectively intervened a pair of left and right rear cushions 3229. The left and right seat frames 3227 are supported, from the lower side, on a pair of left and right rear sub frames 3228 that extend backward and upward from the upper part of the pivot bracket 3221. On each seat frame 3227 there is supported a seat 3230 for the driver to sit thereon. In front of the seat 3230 there is provided a tank type cover (exterior member) 3283 that covers, from above, the battery 3235 and so forth in the battery unit 3236.

The power unit 3234 houses the electric motor 3233 having the rotation shaft thereof along the left-right direction, within a case 3263 that forms the exterior thereof. The rotation power of the electric motor 3233 is transmitted to a driving shaft 3264 via a transmission mechanism (not shown in the figure), within the case 3263. The driving shaft 3264 projects to the left side of the case 3263, and a front sprocket 3265 is supported on this projecting portion. A chain 3267 is wound on this front sprocket 3265 and a rear sprocket 3266 on the left side of the rear wheel 3225, to thereby enable transmission of the driving force of the power unit 3234 to the rear wheel 3225.

The top and bottom of the rear part of the case 3263 are respectively fitted to the top and bottom of the pivot bracket 3221 by means of bolt fastening or the like. On the upper side of the front part of the case 3263 there is provided a narrow width part 3271 that extends upward, and the upper end part of this narrow width part 3271 is fitted by means of bolt fastening or the like to an attachment plate 3240 that projects to the lower side of the front part of the main frame 3220. As a result, the power unit 3234 is stationarily supported on the vehicle body frame 3211.

At the upper part of the case 3263 there is formed a connection opening 3279 for introducing air for cooling devices into the case 3263. At the lower part of the case 3263 there is formed an air exhaust opening (not shown in the figure), for discharging the air.

The battery unit 3236 has a tank type cover 3283 that forms the exterior thereof. The tank type cover 3283 is provided so as to straddle over (so as to cover from above) the main frame 3220 and the narrow part 3271 of the power unit 3234.

Within side part storage parts 3285 on both the left and right side of the tank type cover 3283, there is respectively stored a battery 3235. In an upper storage part 3284 of the tank type cover 3283 there are stored an electrical transformer (DC-DC converter) 3286, which is a high voltage electrical component other than the battery 3235, and a motor driver (driving control device) (PDU: power driver unit) 3287. The rear part of a tank type cover 3283 serves as a knee grip part 3283a that is to be sandwiched between both knees of a passenger (driver) sitting on the seat 3230.

The battery 3235 comprises, for example, a plurality of electrical batteries, and it is provided in an L shape in which the lower part rear side thereof is concaved when seen in side view. In the concaved portion on the lower part rear side of the battery 3235, which is the side storage part 3285 on the left side of the battery unit 3236, there is arranged a motor control unit (MCU: motor control unit) 3289 that controls the electric motor 3233 to drive. In the concaved portion similarly on the lower part rear side of the battery 3235, which is the side storage part 3285 on the right side of the battery unit 3236, there is arranged a battery managing unit (BMU: battery managing unit) 3290 that monitors the battery 3235.

The front lower end part of the tank type cover 3283 is fitted to the base end side of the narrow width part 3271 of the power unit 3234, and the rear lower end part of the tank type cover 3283 is fitted to an attachment plate 3241 projecting to the rear part upper side of the main frame 3220, respectively by means of bolt fastening or the like. As a result, the battery unit 3236 is stationarily supported on the vehicle body frame 3211 and the power unit 3234.

The tank type cover 3283 has a case main body 3296 and a cover 3298 that covers an upper opening 3297 of the case main body 3296. At the front end of the cover 3298 there is formed an opening part 3300 that opens forward, and air can be introduced from the outside into the tank type cover 3283 via this opening part 3300 and the upper opening 3297.

At the lower part of each of the left and right side storage parts 3285 of the case main body 3296 there is provided an air exhaust opening 3301 for discharging the air that has been introduced into the battery unit 3236.

The left and right air exhaust openings 3301 are of an accordion shape that can be extended and/or retracted and deformed, and they are respectively connected to the left and right connection openings 3279 of the power unit 3234.

The power unit 3234 and the battery unit 3236 are electrically connected via a connection harness 3237 routed within the main frame 3220 for example.

Electric power of the battery 3235 is supplied to the motor driver 3287 via a contactor that operates in synchronization with a main switch (neither shown in the figure and it is converted from direct current into three-phase alternating current at the motor driver 3287, and is then supplied to the electric motor 3233, which is a three-phase alternating current motor. Moreover, the voltage of the battery 3235 is lowered via the electrical transformer 3286, and it is supplied to the 12V sub battery 3291 and general electrical components such as a lamp, and also to control system components such as the motor control unit 3289.

The battery 3235 is recharged by a recharger (not shown in the figure), connected to an AC100V power supply for example. The recharging/discharging status and the temperature of the battery 3235 are monitored by the battery managing unit 3290, and this information is shared with the motor control unit 3289. The motor control unit 3289 receives inputs of output request information from a throttle (accelerator) sensor (not shown in the figure), and based on this output request information, the motor control unit 3289 performs control to drive the electric motor 3233 via the motor driver 3287.

Here, the two wheeled vehicle is provided with a vehicle approach alert device 3250 that notifies pedestrians or other road users of approach of the vehicle, by outputting a predetermined alert sound from a sound emitter installed on the vehicle.

In the present embodiment, a speaker 3251 that serves as .a sound emitter for emitting an alert sound is arranged at the rear of a head pipe 3212 and diagonally upward and forward of the power unit 3234, and below the front end of the main frame 3220 when seen in side view, and it is housed in the front end part of the tank type cover 3283.

The sound emission direction (sound emission direction, shown with arrow 3251a in the figure) of the speaker 3251 is oriented diagonally downward and forward, and sound emission is performed toward the ground from an opening part 3251b formed in the front end part of the tank type cover 3283.

Within the front end part of the tank type cover 3283 and above the speaker 3251, there is arranged and housed a control unit (output control device) 3252 for output control of the speaker 3251. The sound volume of the speaker 3251 is controlled by this control unit 3252 according to the vehicle speed and so forth. By arranging the control unit 3252 and the speaker 3251 in close proximity to each other, installation of wiring between them becomes easy.

Within the tank type cover 3283, there is arranged and housed a sub battery 3291, and this sub battery 3291 supplies electric power to the speaker 3251 and the control unit 3252.

With the speaker 3251, the control unit 3252, the sub battery 3291, and the motor control unit 3289 being collectively arranged within the tank type cover 3283, installation of wiring between the respective devices becomes easy.

As has been described above, also in the vehicle approach alert device 3250 for a saddle-ridden electric vehicle in the above embodiment, with the speaker 3251 being arranged within the exterior member (tank type cover 3283), which is comparatively large, it is possible to make use of the hollow within the exterior member to thereby achieve superior sound transmission to the surrounding area, and suppress sound transmission to the upper side (driver side) of the exterior member to thereby reduce the magnitude of sound to be heard by the driver. Moreover, with the speaker 3251 emitting sound diagonally downward and forward, it is possible to transmit sound efficiently to the surrounding area, using ground sound reflection. Furthermore, it is possible, with the exterior member, to protect the speaker 3251 easily.

Moreover, with the opening part 3251b provided in the exterior member, sound of the speaker 3251 can be easily emitted to the outside of the cover (diagonally downward and forward), and sound can be transmitted efficiently to the surrounding area using ground sound reflection, while reducing the magnitude of an alert sound to be heard by the driver.

Furthermore, with the speaker 3251 being arranged within the front end part of the exterior member, it is possible to have the speaker 3251 distanced from the driver, and the magnitude of the alert sound to be heard by the driver can be reduced.

In addition, by arranging the speaker 3251, the sub battery 3291, the control unit 3252, and the motor control unit 3289 in close proximity to each other, installation of wiring between them can be easily done, and the respective control devices can be protected easily.

The present invention is not limited to the respective embodiments above, and for example in addition to an electric two wheeled vehicle and an electric three wheeled vehicle described above, the invention may also be applied to a three wheeled vehicle with two front wheels and one rear wheel, or to a four wheeled vehicle, as long as the vehicle is an electric vehicle on which a driver straddles over the vehicle body to ride the vehicle. Moreover, the configurations of the respective embodiments above may also be appropriately combined or switched.

The configurations of the respective embodiments above are an example of the present invention, and various types of modifications may be made thereto without departing from the scope of the invention.

INDUSTRIAL APPLICABILITY

According to the present invention, it is possible to provide a vehicle approach alert device for a saddle-ridden electric vehicle in which the arrangement of a sound emitter for outputting an alert sound for notifying the surroundings of approach of a vehicle is optimized.

DESCRIPTION OF REFERENCE SYMBOLS 10, 101, 201 Two wheeled vehicle (saddle-ridden electric vehicle)
301 Three wheeled vehicle (saddle-ridden electric vehicle)
41, M, 332 Electric motor (power engine)
103 Motor unit (electric motor, power engine)
40, 140, 250, 340 Vehicle approach alert device for saddle-ridden electric vehicle
48, 48', 160, 160', 251, 341 Speaker (sound emitter)
48a, 48a', 160a, 160a', 251a, 341a Sound emission direction
49, 251c, 342 Sound emission duct
11, 111, 234, 305 Vehicle body frame
12, 112, 236, 312 Head pipe
43A, 121A, 207A, 324A Front cover
16a, 105a, 307a Front fender
21 Lower down frame (vehicle body frame member)
305f Front part frame (vehicle body frame member)
15, 106, 313 Front fork
105 Front wheel
1201 Two wheeled vehicle (saddle-ridden electric vehicle)
1301 Three wheeled vehicle (saddle-ridden electric vehicle)
1240, 1340 Vehicle approach alert device for saddle-ridden electric vehicle
1241, 1341 Speaker (sound emitter)
1241a, 1341a Sound emission direction
1218U Swing unit (power engine, driving unit)
1218a Unit cover
1309 Power unit (power engine, driving unit)
1358a Extended cover (unit cover)
1208, 1332 Electric motor
1207, 1308 Rear wheel (driving wheel)
1211, 1305 Vehicle body frame
1317 Swing joint (swing mechanism)
1351 Battery
2010, 2201 Two wheeled vehicle (saddle-ridden electric vehicle)
2011, 2234 Vehicle body frame
2012, 2236 Head pipe
2018, 2204 Head lamp (electrical component)
2019 Meter unit (electrical component)
2040, 2250 Vehicle approach alert device for saddle-ridden electric vehicle
2041, 2251 Speaker (sound emitter)
2041a, 2251a Sound emission direction
2050 Power unit assembly (power engine)
2070, M Electric motor
2221U Swing unit (power engine)
3010, 3210 Two wheeled vehicle (saddle-ridden electric vehicle)
3011, 3211 Vehicle body frame
3012, 3212 Head pipe
3032, 3283 Tank type cover (exterior member)
3032a, 3283a Knee grip part
3040, 3250 Vehicle approach alert device for saddle-ridden electric vehicle
3041, 3251 Speaker (sound emitter)
3041a, 3251a Sound emission direction
3046, 3252 Control unit (output control device)
3050 Power unit assembly (power engine)
3070, 3233 Electric motor
3107, 3287 Motor driver (driving control device)
3127, 3291 Sub battery (battery)
3234 Power unit (power engine)

The invention claimed is:

1. A vehicle approach alert device for a saddle-ridden electric vehicle that is attached to a vehicle body of the saddle-ridden electric vehicle having an electric motor included in a power engine, and that is provided with a sound emitter that emits an alert sound to a surrounding area for notifying the surrounding area of an approach of the saddle-ridden electric vehicle, wherein:
the alert sound of the sound emitter is controlled according to a traveling status of the saddle-ridden electric vehicle;
the sound emitter is arranged so that a direction of the alert sound is oriented diagonally downward and forward of the saddle-ridden electric vehicle,
the sound emitter raises a frequency of the alert sound with an increase in a rotation speed of the electric motor,
an increase rate of this alert sound frequency is set so as to be lower than an increase rate of the rotation speed of the electric motor, and
the alert sound is set to be in a range between 100 Hz and 800 Hz and includes:
a first sound having a frequency and serving as a reference sound,
a second sound having a frequency higher than the frequency of the first sound,
a third sound having a frequency higher than the frequency of the second sound, and
a difference of 1 subtracted from a ratio of the frequency of the second sound with respect to the frequency of the first sound is set to be greater than a difference of a ratio of the frequency of the second sound with respect to the frequency of the first sound subtracted from a ratio of the frequency of the third sound with respect to the frequency of the first sound.

2. The vehicle approach alert device for a saddle-ridden electric vehicle according to claim 1, wherein:
the saddle-ridden electric vehicle is provided with a front cover that covers a periphery of a head pipe of a vehicle body frame; and
the sound emitter is arranged on an inner side of the front cover.

3. The vehicle approach alert device for a saddle-ridden electric vehicle according to claim 2, wherein:
the saddle-ridden electric vehicle is further provided with a sound emission duct that extends diagonally downward and forward from the sound emitter along the alert sound direction; and
the sound emitter is attached to the vehicle body frame, on the inner side of the front cover, and emits the alert sound to an outer side of the front cover through the sound emission duct.

4. The vehicle approach alert device for a saddle-ridden electric vehicle according to claim 2, wherein the sound emitter is arranged below the head pipe.

5. The vehicle approach alert device for a saddle-ridden electric vehicle according to claim 4, wherein the sound emitter is arranged on an outer side of a front fender of the saddle-ridden electric vehicle.

6. The vehicle approach alert device for a saddle-ridden electric vehicle according to claim 2, wherein:
the saddle-ridden electric vehicle is further provided with a vehicle body frame member that extends diagonally backward and downward of this saddle-ridden electric vehicle, from the head pipe;
on the head pipe there is steerably supported a front fork that extends diagonally forward and downward and that suspends a front wheel; and
the sound emitter is arranged in front of the vehicle body frame member and at the rear of the front fork when this saddle-ridden electric vehicle is seen from a side.

7. The vehicle approach alert device for a saddle-ridden electric vehicle according to claim 2, wherein:
on the head pipe, there is steerably supported a front fork that extends diagonally forward and downward and that suspends a front wheel; and
the sound emitter is arranged in front of the front fork when this saddle-ridden electric vehicle is seen from a side.

8. The vehicle approach alert device for a saddle-ridden electric vehicle according to claim 1, wherein:
the saddle-ridden electric vehicle is further provided with a driving unit that supports the electric motor and a driving wheel, and that is connected to the vehicle body frame so as to be able to swing vertically with respect to the vehicle body frame; and
the sound emitter is provided on the driving unit and also at a position below a driver's seat part.

9. The vehicle approach alert device for a saddle-ridden electric vehicle according to claim 8, wherein:
the saddle-ridden electric vehicle is further provided with a unit cover that covers the driving unit; and
within the unit cover, there is arranged the sound emitter.

10. The vehicle approach alert device for a saddle-ridden electric vehicle according to claim 8, wherein:
the saddle-ridden electric vehicle is a swing type vehicle such that the vehicle body frame swings left and right with respect to the driving unit having a pair of the driving wheels; and
the sound emitter is arranged above a swing mechanism that connects the driving unit and the vehicle body frame.

11. The vehicle approach alert device for a saddle-ridden electric vehicle according to claim 8, wherein:
the saddle-ridden electric vehicle is further provided with a battery between the pair of driving wheels; and
the sound emitter is arranged in front of the battery.

12. The vehicle approach alert device for a saddle-ridden electric vehicle according to claim 1, wherein the sound emitter is arranged on an inner side of an electrical component that is exposed to an outside of the saddle-ridden electric vehicle.

13. The vehicle approach alert device for a saddle-ridden electric vehicle according to claim 12, wherein the electrical component is arranged in front of a head pipe of the vehicle body frame.

14. The vehicle approach alert device for a saddle-ridden electric vehicle according to claim 12, wherein the electrical component is a head lamp that is arranged at a front end of the vehicle body.

15. The vehicle approach alert device for a saddle-ridden electric vehicle according to claim 12, wherein the electrical component is a meter unit that is arranged at a front end of the vehicle body.

16. The vehicle approach alert device for a saddle-ridden electric vehicle according to claim 1, wherein:
the saddle-ridden electric vehicle is further provided, at the rear of a head pipe of a vehicle body frame, with an exterior member having a knee grip part that is to be sandwiched between both knees of the driver; and
the sound emitter is arranged on an inner side of the exterior member.

17. The vehicle approach alert device for a saddle-ridden electric vehicle according to claim 16, wherein the exterior member has an opening part that opens toward the direction of the alert sound.

18. The vehicle approach alert device for a saddle-ridden electric vehicle according to claim 16, wherein the sound emitter is arranged within a front end part of the exterior member.

19. The vehicle approach alert device for a saddle-ridden electric vehicle according to claim 16, wherein a driving control device for the power engine and an output control device for the sound emitter are arranged within the exterior member.

20. The vehicle approach alert device for a saddle-ridden electric vehicle according to claim 16, wherein a battery that serves as a power supply for the sound emitter is arranged within the exterior member.

* * * * *